United States Patent [19]
Murayama et al.

[11] Patent Number: 5,686,022
[45] Date of Patent: *Nov. 11, 1997

[54] PHOSPHORESCENT PHOSPHOR

[75] Inventors: Yoshihiko Murayama; Nobuyoshi Takeuchi; Yasumitsu Aoki; Takashi Matsuzawa, all of Tokyo, Japan

[73] Assignee: Nemoto & Co., Ltd., Tokyo, Japan

[*] Notice: The term of this patent shall not extend beyond the expiration date of Pat. No. 5,424,006.

[21] Appl. No.: 544,810

[22] Filed: Oct. 18, 1995

[30] Foreign Application Priority Data

Nov. 1, 1994 [JP] Japan ................... 6-268463

[51] Int. Cl.$^6$ ....................... C09K 11/80
[52] U.S. Cl. ....................... 252/351.4 R
[58] Field of Search ............... 252/301.4 R

[56] References Cited

U.S. PATENT DOCUMENTS 5,424,006  6/1995  Murayama et al. ........... 252/301.4 R

FOREIGN PATENT DOCUMENTS

| | | |
|---|---|---|
| 59-102979 | 6/1984 | Japan . |
| 61-254689 | 11/1986 | Japan . |
| 63-191886 | 8/1988 | Japan . |
| 63-191887 | 8/1988 | Japan . |
| 6-248265 | 6/1994 | Japan . |

OTHER PUBLICATIONS

Abbruscato, "Optical and Electrical Properties of SrAl$_2$O:Eu$^{2+}$", J. Electrochem. Soc.:Solid State Science, vol. 118(6), Jun. 1971, pp. 930–932.

*Primary Examiner*—Melissa Bonner
*Attorney, Agent, or Firm*—Longacre & White

[57] ABSTRACT

A phosphorescent phosphor comprising a matrix expressed by $M_{1-x}Al_2O_{4-x}$ (except X=0) in which M is at least one metal element selected from a group consisting of calcium, strontium and barium. X is in a range $-0.33 \leq x \leq 0.60$ (except x=0). Europium is doped to said matrix as an activator and at least one element selected from a group consisting of lanthanum, cerium, praseodymium, neodymium, samarium, gadolinium, terbium, dysprosium, holmium, erbium, thulium, ytterbium and lutetium is doped to said matrix as a co-activator. Magnesium is doped to M.

15 Claims, 18 Drawing Sheets

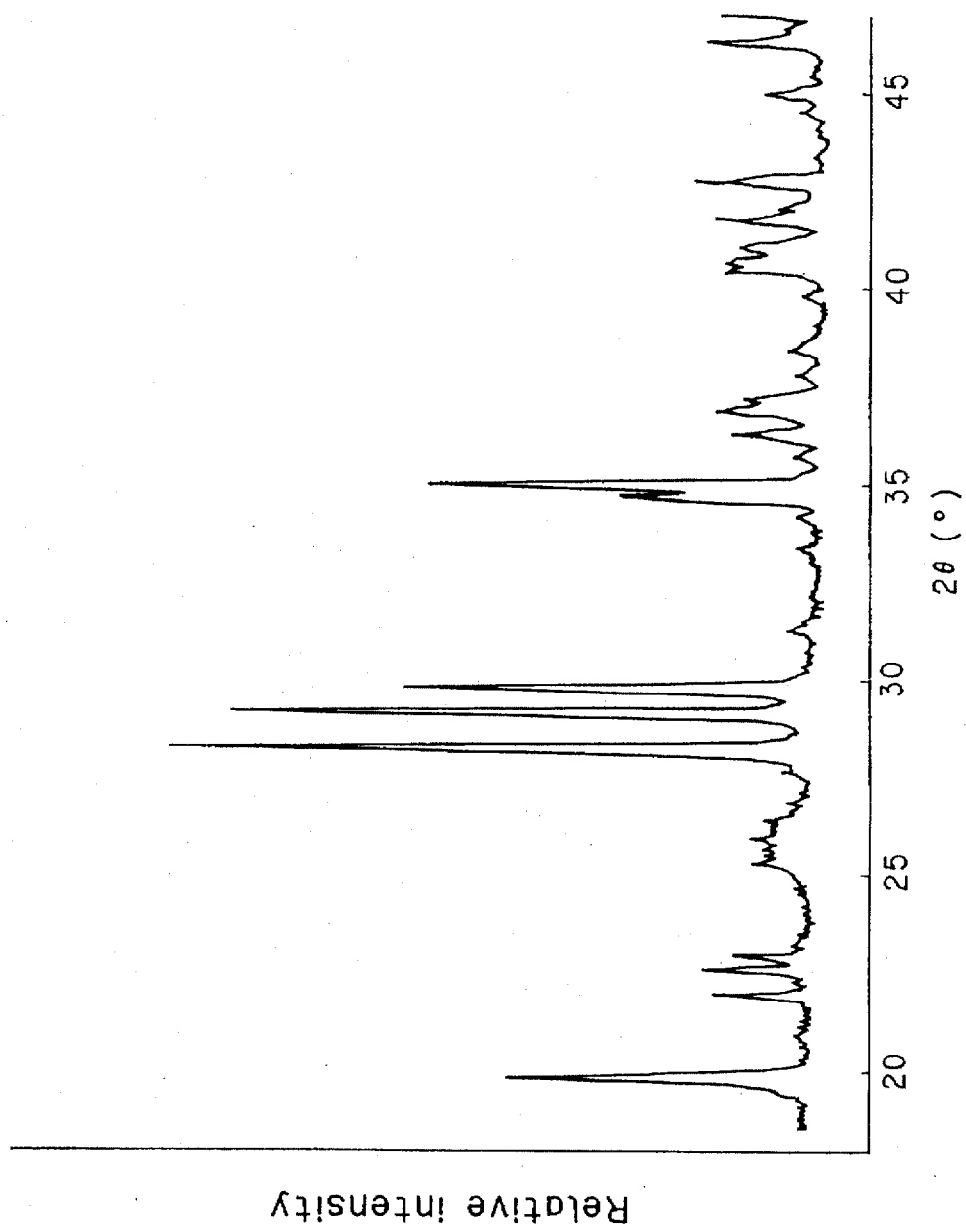

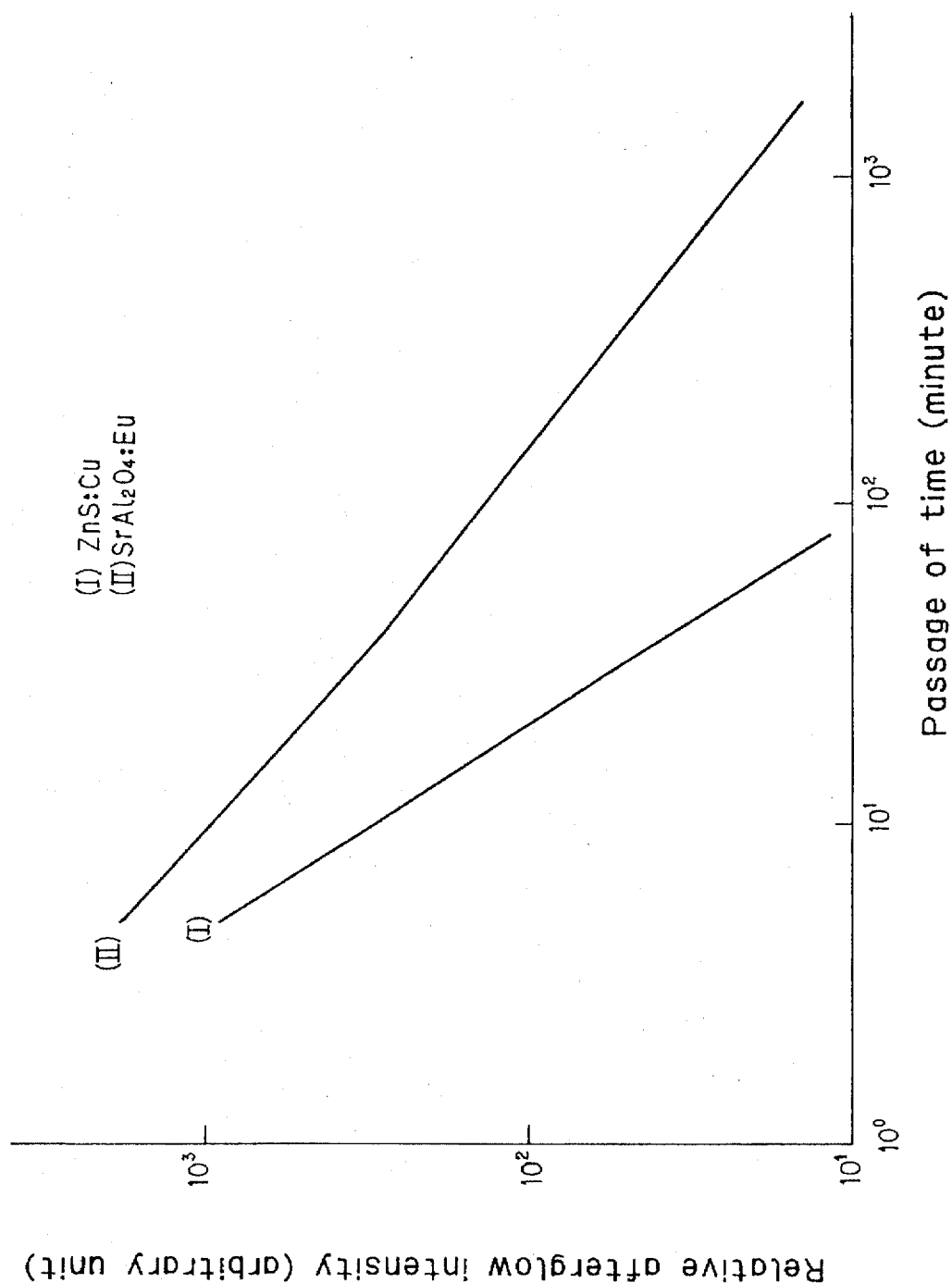

(I) 20 seconds after irradiation of D65 standard light for 2 seconds
(II) 20 seconds after irradiation of D65 standard light for 4 seconds
(III) 20 seconds after irradiation of D65 standard light for 8 seconds
(IV) 20 seconds after irradiation of D65 standard light for 20 seconds (I) 20 seconds after irradiation of D65 standard light for 1 second
(II) 20 seconds after irradiation of D65 standard light for 2 seconds
(III) 20 seconds after irradiation of D65 standard light for 4 seconds (I) 20 seconds after irradiation of D65 standard light for 2 seconds
(II) 20 seconds after irradiation of D65 standard light for 4 seconds
(III) 20 seconds after irradiation of D65 standard light for 6 seconds

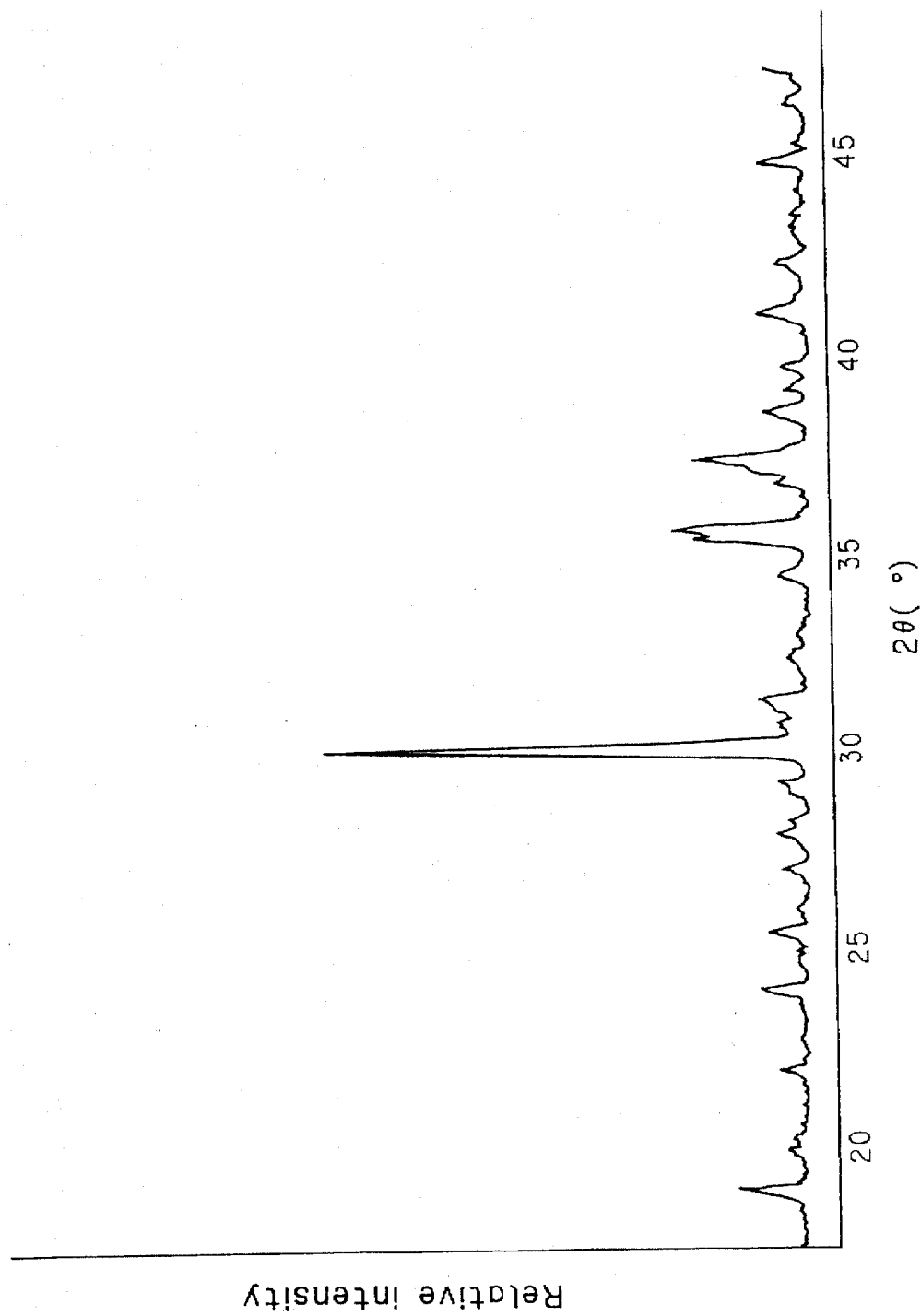

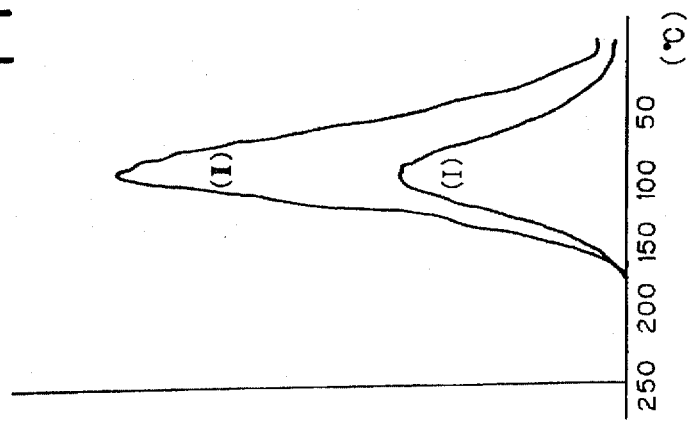
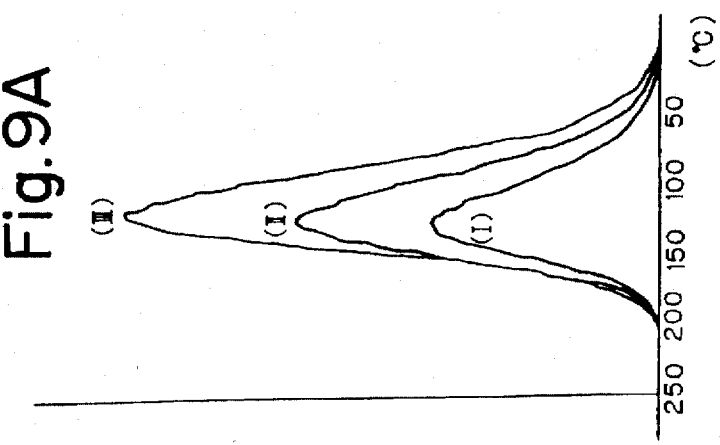

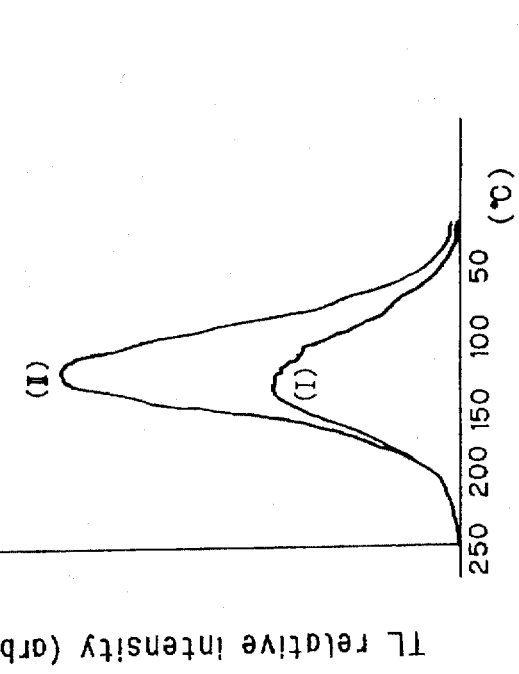
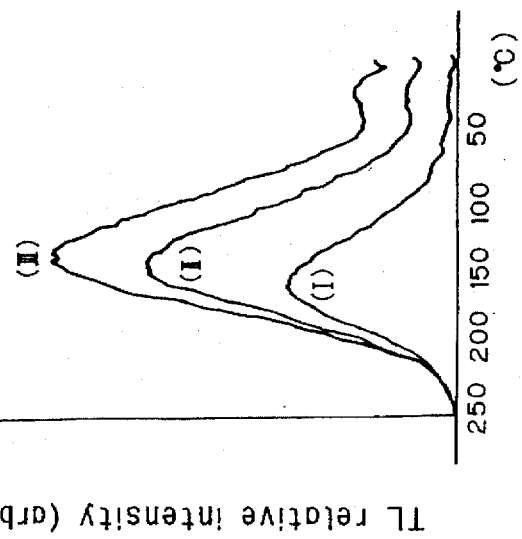

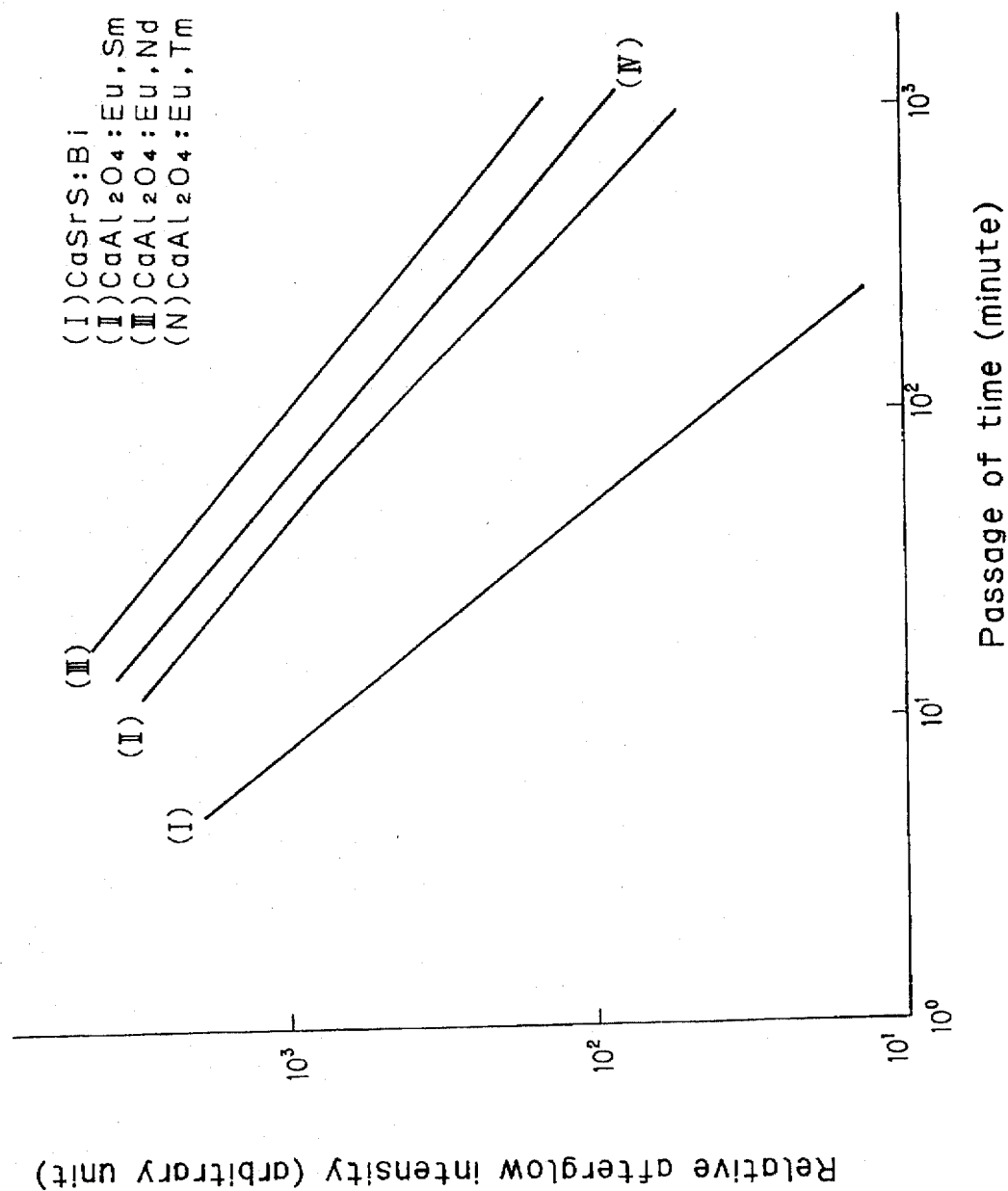

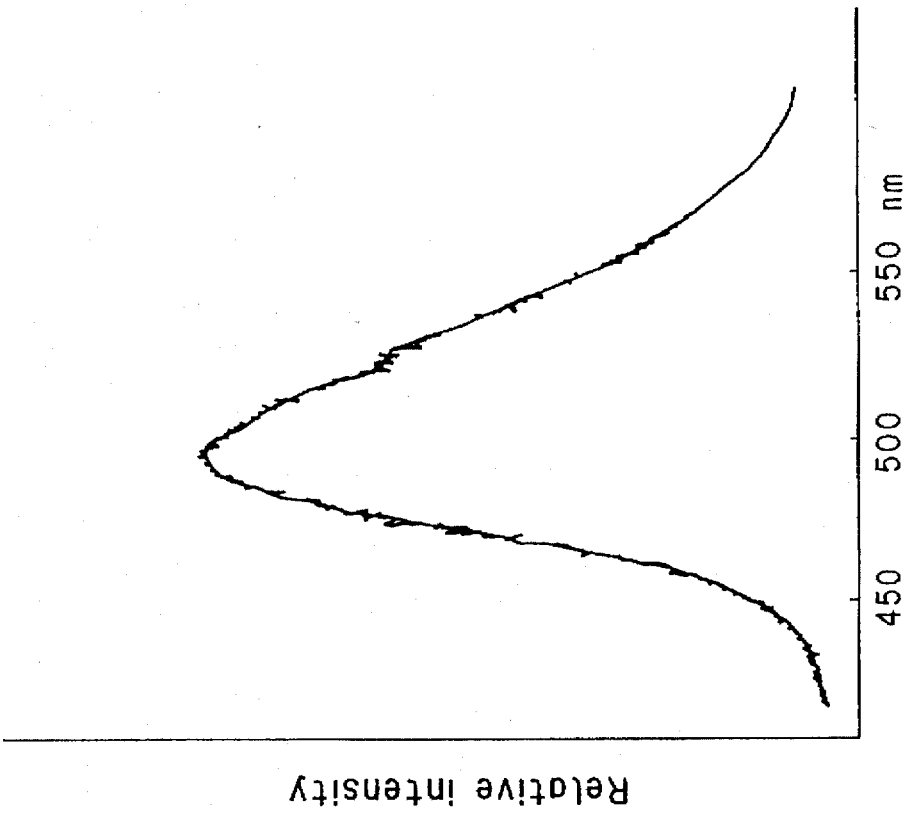
Fig. 14A Excitation spectrum
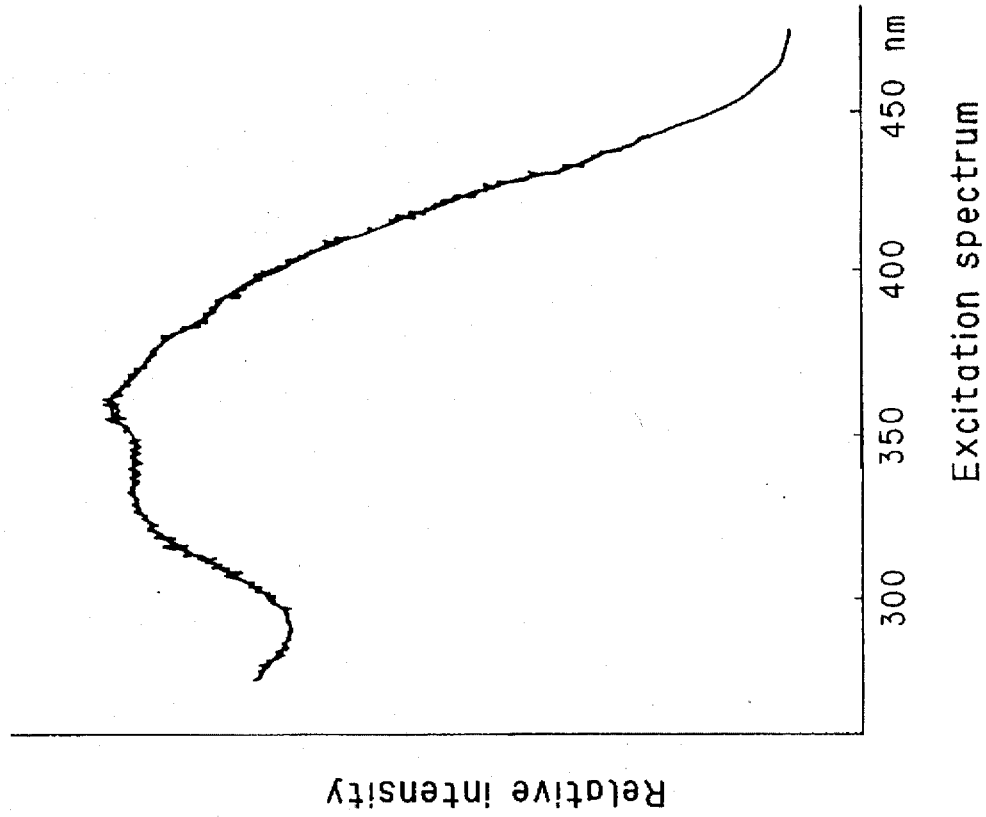
Fig. 14B Emission spectrum

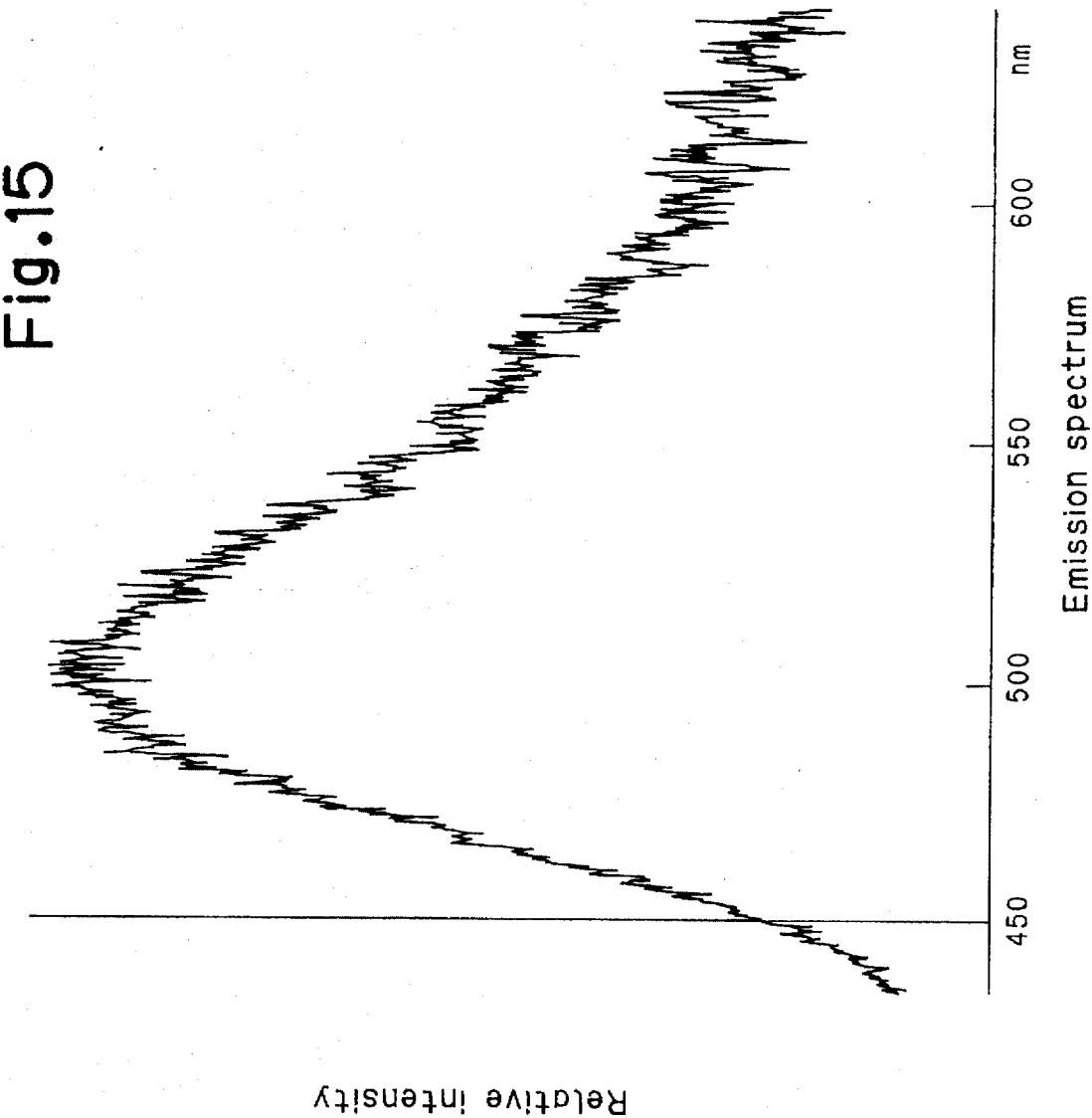

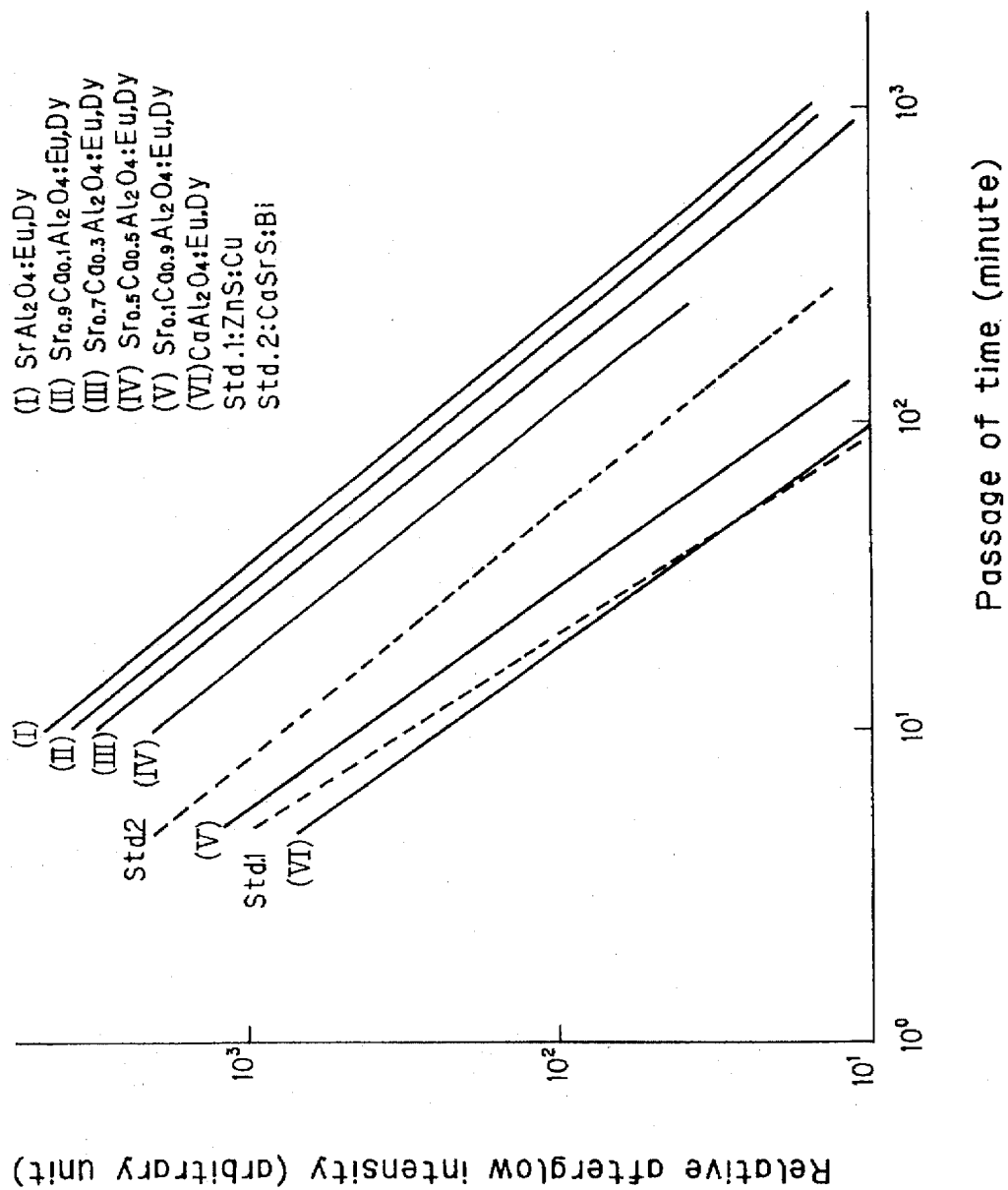

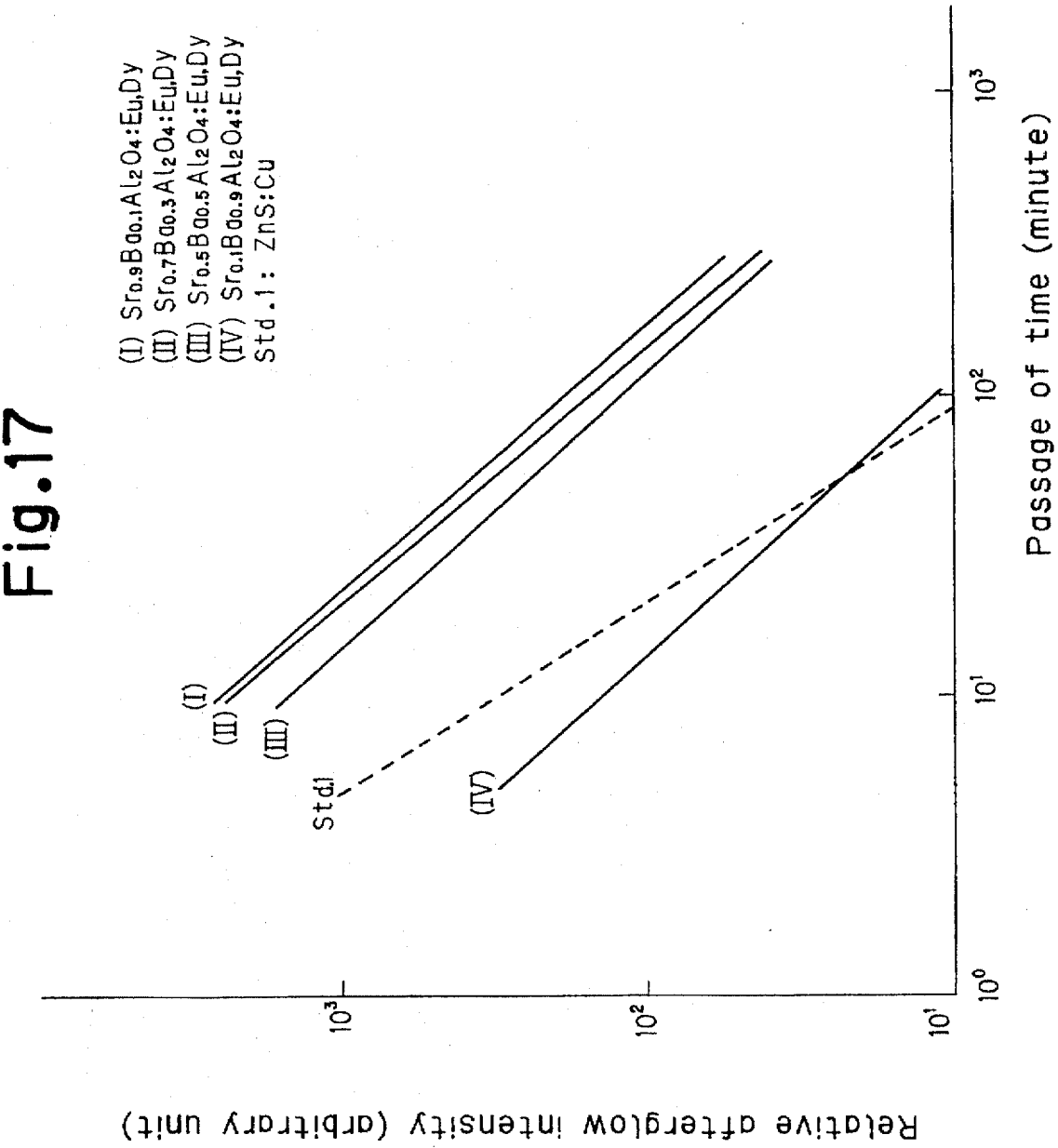

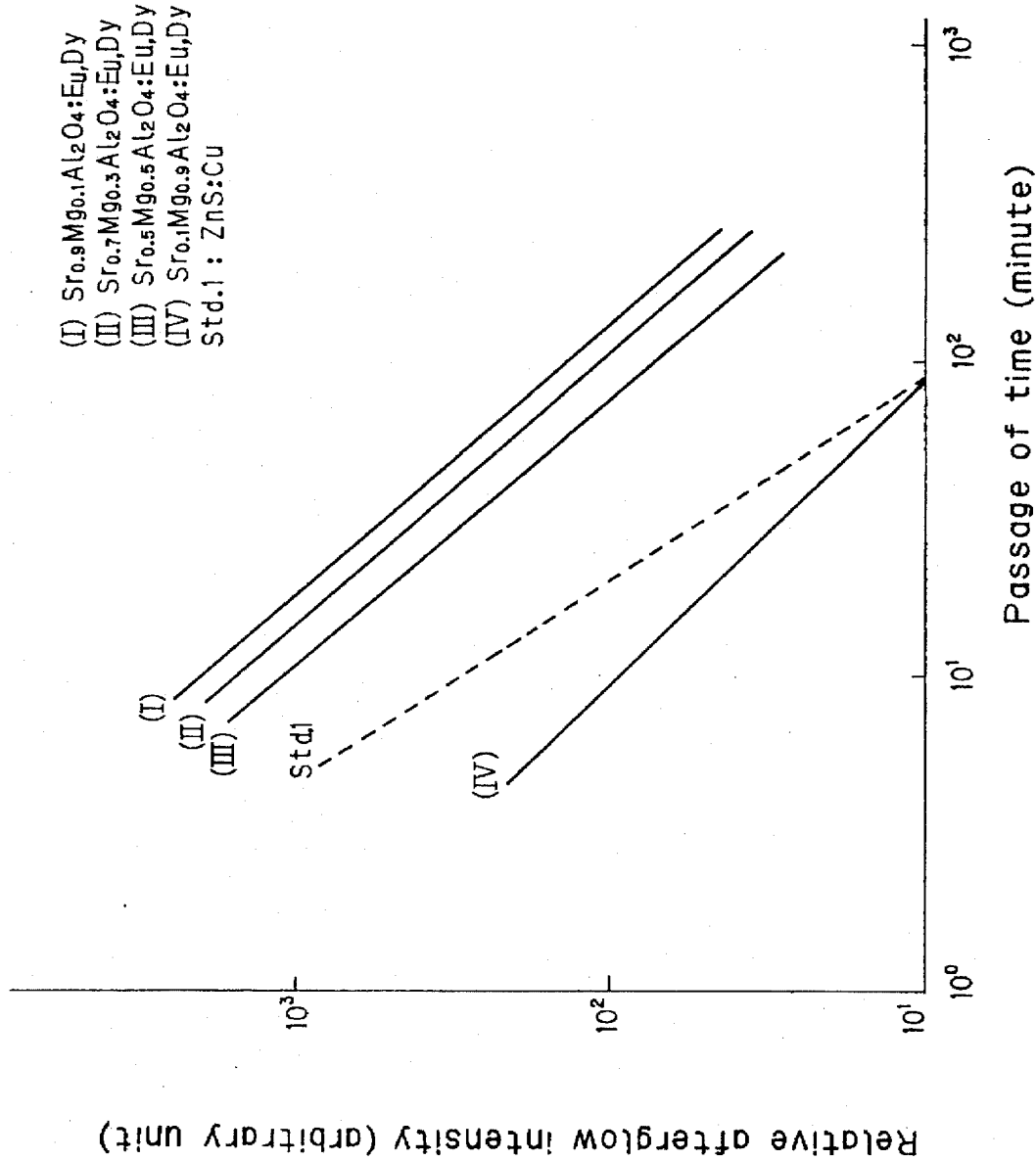

PHOSPHORESCENT PHOSPHOR

BACKGROUND OF THE INVENTION

The present invention relates to a phosphorescent phosphor, and more particularly, to a novel phosphorescent phosphor which shows excellent photo-resistance required for the phosphorescent phosphor to be utilized both indoors and outdoors mainly as a night-time display, and which shows an extremely long afterglow characteristics.

Generally, the afterglow time of a fluorescent substance is short, i.e., the light emitted from the fluorescent substance decays immediately after removal from the source of excitation. Unlike such a fluorescent substance, some substances emit light after having absorbed ultraviolet radiation or the like and afterglow thereof that can be visually observed continues for a considerable time (ranging from several tens of minutes to several hours) after the source of stimulus is cut off. Such substances are called phosphorescent phosphors.

As phosphors, sulfide phosphors are known. Examples of sulfide phosphors include CaS: Bi (which emits light of violet blue), CaSrS: Bi (which emits light of blue), ZnS: Cu (which emits light of green) and ZnCdS: Cu (which emits light of yellow or orange). However, any of these sulfide phosphors is chemically unstable and shows degraded light resistance, i.e., it suffers from problems that must be solved for practical use.

The most extensively used phosphorescent phosphor among such sulfide phosphors is zinc sulfide phosphor (ZnS: Cu). However, zinc sulfide phosphor is decomposed as the result of irradiation by ultraviolet radiation in the presence of moisture and thus blackens or reduces the luminance thereof. Therefore, it is difficult to use this phosphor in fields where it is placed outdoors and exposed to a direct sunlight, that is, application thereof is limited to luminous clocks/watches or clocks/watches and instrument dials, evacuation guiding signs or indoor nighttime display.

Even when zinc sulfide phosphor is used for a luminous clock, since the afterglow thereof which allows the time to be visually recognized lasts only from 30 minutes to 2 hours, a radioactive substance must be doped to the phosphorescent phosphor and a self-luminous paint which keeps emitting light by absorbing an energy of radiation from radioactive substance must be employed.

In view of the foregoing, the inventor of the present invention has disclosed a phosphorescent phosphor in Japanese Patent Application No. 6-4989 which shows afterglow characteristics that last much longer than those of presently available sulfide phosphorescent phosphors, and which is chemically stable and shows excellent photo-resistance over a long time and which comprises a matrix expressed by $MAl_2O_4$ in which M is at least one metal element selected from a group consisting of calcium, strontium and barium.

According to the foregoing invention, the inventor of the present invention took note of alkaline earth metal type aluminate activated by europium or the like, which is a novel phosphorescent phosphor completely different from conventional sulfide phosphors, conducted various experiments, and discovered that this phosphorescent phosphor showed afterglow characteristics which lasted much longer than those of currently available sulfide phosphors and was chemically stable because of it is an oxide type substance and showed excellent photo-resistance. Therefore, the inventors came to the conclusion that this phosphorescent phosphors could solve all the problems of the prior art and could thus be employed in various applications as a luminous paint or pigment which could be visually recognized for a night without containing radioactivity.

As the foregoing phosphorescent phosphor, there has been suggested a phosphorescent phosphor comprising a matrix expressed by $MAl_2O_4$ in which M is at least one metal element selected from a group consisting of calcium, strontium and barium, wherein europium is doped to said matrix as an activator and at least one element selected from a group consisting of lanthanum, cerium, praseodymium, neodymium, samarium, gadolinium, terbium, dysprosium, holmium, erbium, thulium, ytterbium and lutetium is doped to said matrix as a co-activator.

Also a phosphorescent phosphor has been suggested which comprised a matrix including a plurality of metal elements consisting of magnesium doped to M.

In addition to the two types of phosphorescent phosphors, another phosphorescent phosphor has been suggested, in which 0.002% to 20% of europium is doped to said matrix as an activator in terms of mol % relative to the metal element expressed by M. Another phosphorescent phosphor has been suggested, 0.002% to 20% of at least one element selected from a group consisting of lanthanum, cerium, praseodymium, neodymium, samarium, gadolinium, terbium, dysprosium, holmium, erbium, thulium, ytterbium and lutetium is doped to said matrix as a co-activator in terms of mol % relative to the metal element expressed by M in addition to the europium serving as the activator.

Additionally, it is possible to add 1–10% by weight of boric acid as flux to the starting material to perform the aforementioned syntheses of the phosphorescent phosphors. In this case, if the amount of flux is less than 1% by weight, the effect of flux vanishes and if the amount of flux exceeds 10% by weight, flux is solidified, so that it becomes difficult to perform the milling and sieving which must be performed later.

Since the foregoing novel phosphorescent phosphors have not been laid open, the contents of the invention applied in Japanese Patent Application No. 6-4989 will now be described.

Examples of phosphorescent phosphor according to the invention disclosed in Japanese Patent Application No. 6-4989 (hereinafter called as a "applied invention") and expressed by $MAl_2O_4$ will now be described, the examples differing from each other in terms of the type (M) of a metal element, concentration of europium which is the activator or type and concentration of the co-activator.

First, a phosphorescent phosphor which employs strontium as the metal element (M), which employs europium as an activator and which employs no co-activator will be described as example 1 of the applied invention.

Example 1 of Applied Invention: Synthesis of $SrAl_2O_4$: Eu phosphorescent phosphor and characteristics thereof Sample 1-(1)

As an activator 1.76 g (0.005 mol) of europium oxide ($Eu_2O_3$) was added to 146.1 g (0.99 mol) of strontium carbonate having reagent grade and 102 g (1 mol) of alumina having reagent grade and, further, 5 g (0.08 mol) of boric acid was added as flux thereto. After the resultant mixture was sufficiently mixed using a ball mill, the sample was fired for 1 hour at 1300° C. in a stream of nitrogen-hydrogen mixture gas (97:3) (flow rate: 0.1 liter/min) using an electric furnace. Thereafter, the sample was cooled to a room temperature for about 1 hour. The obtained powder compound was sieved having 100 mesh to obtain phosphorescent phosphor sample 1-(1).

FIG. 1 shows the results of analysis of the crystal structure of the obtained phosphorescent phosphor by XRD (X-ray diffractiometry). It was discovered from the diffraction peak characteristics that the obtained phosphorescent phosphor was $SrAl_2O_4$ having spinel structure.

FIGS. 2A and 2B respectively show the excitation spectrum of that phosphorescent phosphor and the afterglow emission spectrum thereof obtained after removal from the source of light.

From the same figure, it was made evident that the peak wavelength of the emission spectrum of $SrAl_2O_4$: Eu phosphorescent phosphor is about 520 nm which indicates green.

FIG. 3 and Table 2 show the results of the comparison between the measurements of the afterglow characteristics of the obtained $SrAl_2O_4$: Eu phosphorescent phosphor and those of ZnS: Cu phosphor which is available on the market and which emits light of green (manufactured by Nemoto & Co., LTD: trade mark: GSS, and the wavelength of emission peak: 530 nm).

The afterglow characteristics were measured in the manner described below: 0.05 g of the obtained phosphorescent phosphor powder was taken on a sample plate having an inner diameter of 8 mm and made of aluminum (sample thickness: 0.1 $g/cm_2$), and that sample was left in the darkness for about 15 hours to remove afterglow. Thereafter, the sample was irradiated by a $D_{65}$ standard light source at 200 lux for 10 minutes, and the obtained afterglow was measured using a luminance measuring device which employed a photo-multiplier.

As can be apparent from FIG. 3, the afterglow of $SrAl_2O_4$: Eu phosphorescent phosphor according to the present invention is highly bright and the decay thereof is slow. As the time passes, a difference in the intensity of afterglow between $SrAl_2O_4$: Eu phosphorescent phosphor and ZnS: Cu phosphor increases. In FIG. 3, the broken line indicates the level of visually recognizable light intensity (corresponding to a luminance of about 0.3 $mCd/m^2$). It can be inferred from this broken line which indicates the afterglow characteristic of $SrAl_2O_4$: Eu phosphorescent phosphor that afterglow thereof will be recognized 24 hours later. When afterglow of $SrAl_2O_4$: Eu phosphorescent phosphor was actually measured 15 hours after excitation, it was observed as visually recognizable.

Table 2 shows the intensity of afterglow of sample 1-(1) which was measured 10 minutes, 30 minutes and 100 minutes after excitation, respectively, in terms of the relative value to the light intensity of ZnS: Cu phosphor. It can be seen from Table 2 that the afterglow luminance of $SrAl_2O_4$: Eu phosphorescent phosphor according to the applied invention, measured 10 minutes after excitation, is 2.9 times that of ZnS: Cu phosphor, and that the afterglow luminance of $SrAl_2O_4$: Eu phosphorescent phosphor according to the present invention, measured 100 minutes after excitation, is 17 times that of ZnS: Cu phosphor.

FIG. 4 shows the results of the examination of the thermo-luminescence characteristics (glow curves) of $SrAl_2O_4$: Eu phosphorescent phosphor according to the applied invention which were measured when the phosphorescent phosphor was illuminated in a temperature range between the room temperature and 250° C. using a TLD reader (KYOKKO TLD-2000 system). It can be seen from FIG. 4 that the thermo-luminescence characteristics of the phosphorescent phosphor according to the present invention have three glow peaks at about 40° C., 90° C. and 130° C., and that the peak at 130° C. is the main glow peak. The glow curve of ZnS: Cu phosphor, indicated by the broken line in FIG. 4, peak at about 40° C. It is considered that a deep trapping level of $SrAl_2O_4$: Eu phosphorescent phosphor according to the applied invention, corresponding to a high temperature of 50° C. or above, increases the time constant of afterglow, and thus enhances the afterglow characteristics over a long time. Samples 1-(2) through 1-(7)

$SrAl_2O_4$: Eu phosphorescent phosphor samples (sample 1-(2) through 1-(7)) having compositions shown in Table 1 were manufactured in the same manner as that of sample 1-(1) with the exception that the concentration of europium was altered, as shown in Table 1.

TABLE 1

| | Material Mixing Ratio | | |
|---|---|---|---|
| Sample | Strontium carbonate | Alumina | Europium |
| Sample 1- (2) | 0.99998 mol | 1.0 mol | 0.00001 mol |
| (3) | 0.9999 | 1.0 | 0.00005 |
| (4) | 0.995 | 1.0 | 0.0025 |
| (5) | 0.97 | 1.0 | 0.015 |
| (6) | 0.90 | 1.0 | 0.05 |
| (7) | 0.80 | 1.0 | 0.1 |

The results of the examination of the afterglow characteristics of these samples 1-(2) through 1-(7), together with those of sample 1-(1), are shown in Table 2.

It can be seen from Table 2 that if the amount of added Eu is between 0.005 mol and 0.1 mol, the afterglow characteristic of $SrAl_2O_4$ is more excellent than ZnS: Cu phosphor and the afterglow luminance 10 minutes after is also more excellent than ZnS: Cu phosphor. Furthermore, even when the proportion of Eu is 0.00002 mol or 0.2 mol, afterglow of $SrAl_2O_4$: Eu phosphorescent phosphor has a higher luminance than that of ZnS: Cu phosphor 30 minutes after excitation ceases.

Further, since Eu is expensive, if economy and deterioration in the afterglow characteristics due to concentration quenching are taken into consideration, addition of Eu at a proportion of 0.2 mol (20 mol %) or above is meaningless. Conversely, when judging in terms of afterglow characteristics, although the luminance of $SrAl_2O_4$ 10 minutes after excitation is lower than ZnS: Cu phosphor when the amount of Eu is between 0.00002 mol (0.002 mol %) and 0.0001 mol (0.01 mol %), it has a higher luminance than ZnS: Cu phosphor 10 minutes after cessation of excitation, thereby indicating that the effect of added Eu as an activator is evident.

Further, since $SrAl_2O_4$: Eu phosphorescent phosphor is an oxide, it is chemically stable and shows excellent photoresistance when compared with conventional sulfide phosphors (see Tables 24, 25).

TABLE 2

| Sample | Luminance 10 minutes after | Luminance 30 minutes after | Luminance 100 minutes after |
|---|---|---|---|
| ZnS: Cu Std. | 1.00 | 1.00 | 1.00 |
| Sample 1- (1) | 2.90 | 6.61 | 17.0 |
| (2) | 0.41 | 1.20 | 3.10 |
| (3) | 0.56 | 1.50 | 4.80 |
| (4) | 2.40 | 4.50 | 13.5 |
| (5) | 3.01 | 7.04 | 19.2 |
| (6) | 1.10 | 2.70 | 10.3 |
| (7) | 0.32 | 1.11 | 3.02 |

Next, a phosphorescent phosphor which employs strontium as the metal element (M) and which employs europium as an activator and dysprosium as a co-activator will be described as example 2 of the applied invention.

Example 2 of the Applied Invention: Synthesis of $SrAl_2O_4$: Eu, Dy phosphorescent phosphor and characteristics thereof Sample 2-(1)

As an activator and as a co-activator, 1.76 g (0.005 mol) of europium oxide ($Eu_2O_3$) and 1, 87 g (0.005 mol) of dysprosium oxide ($Dy_2O_3$) were added, respectively to 144.6 g (0.98 mol) of strontium carbonate having reagent grade and 102 g (1 mol) of alumina having reagent grade. Further, for example, 5 g (0.08 mol) of boric acid is added thereto as flux. After the resultant mixture was sufficiently mixed using a ball mill, the sample was fired for 1 hour at 1300° C. in a stream of nitrogen-hydrogen mixture gas (97:3) (flow rate: 0.1 liter/min) using an electric furnace. Thereafter, the sample was cooled to a room temperature for about 1 hour. The obtained powder compound was sieved having 100 mesh to obtain phosphorescent phosphor sample 2-(1).

The afterglow characteristics of this phosphorescent phosphor were examined in the same manner as that described above. The results of the examination are shown in sample 2-(1) of FIG. 5 and Table 4.

As can be seen from FIG. 5, the afterglow luminance of $SrAl_2O_4$: Eu, Dy phosphorescent phosphor according to the applied invention, particularly, the luminance of afterglow at an initial stage thereof is much higher than that of ZnS: Cu phosphor, and the decay time constant thereof is high. These indicate that $SrAl_2O_4$: Eu, Dy phosphorescent phosphor according to the present invention is an epoch-making high-luminance phosphorescent phosphor. It can be seen from both the visually recognizable afterglow intensity level and the afterglow characteristic of this $SrAl_2O_4$: Eu, Dy phosphorescent phosphor, shown in FIG. 5, that afterglow of this phosphorescent phosphor will be recognized even 16 hours later.

Table 4 shows the intensity of afterglow of sample 2-(1) which was measured 10 minutes, 30 minutes and 100 minutes, respectively after excitation in terms of the relative value to the afterglow luminescence intensity of ZnS: Cu phosphor. It can be seen from Table 4 that the afterglow luminance of $SrAl_2O_4$: Eu, Dy phosphorescent phosphor according to the applied invention, measured 10 minutes after excitation, is 12.5 times that of ZnS: Cu phosphor, and that the afterglow luminance of $SrAl_2O_4$: Eu, Dy phosphorescent phosphor according to the present invention, measured 100 minutes after excitation, is 37 times that of ZnS: Cu phosphor.

FIG. 6 shows the results of the examination of the thermo-luminescence characteristics (glow curves) of $SrAl_2O_4$: Eu, Dy phosphorescent phosphor according to the applied invention and previously irradiated which was conducted in a temperature range between the room temperature and 250° C. It can be seen from FIGS. 6 and 4 that addition of Dy as a co-activator has changed the main glow peak temperature of thermo-luminescence from 130° C. to 90° C. A high intensity of emission from the trapping level corresponding to 90° C. is considered the cause of a higher luminance of afterglow at the initial stage thereof than that of $SrAl_2O_4$: Eu phosphorescent phosphor. Samples 2-(2) through 2-(7)

$SrAl_2O_4$: Eu, Dy phosphorescent phosphor samples (sample 2-(2) through 2-(7)) having compositions shown in Table 3 were manufactured in the same manner as that of sample 2-(1) with the exception that the proportion of dysprosium was altered, as shown in Table 3.

TABLE 3

| Sample | Material Mixing Ratio | | | |
|---|---|---|---|---|
| | Strontium carbonate | | Europium | Dysprosium |
| Sample 2- | (2) 0.98998 mol | 1.1 mol | 0.005 mol | 0.00001 mol |
| | (3) 0.9899 | 1.0 | 0.005 | 0.00005 |
| | (4) 0.985 | 1.0 | 0.005 | 0.0025 |
| | (5) 0.94 | 1.0 | 0.005 | 0.025 |
| | (6) 0.92 | 1.0 | 0.005 | 0.035 |
| | (7) 0.79 | 1.0 | 0.005 | 0.10 |

The results of the examination of the afterglow characteristics of these samples 2-(2) through 2-(7), together with those of sample 2-(1), are shown in Table 4.

It can be seen from Table 4 that, considering that $SrAl_2O_4$: Eu, Dy phosphorescent phosphor has a more excellent afterglow characteristic and more excellent luminance 10 minutes after excitation than ZnS: Cu phosphor, the optimum proportion of Dy, served as the co-activator, is between 0.005 mol to 0.1 mol. However, even when the proportion of Dy is 0.00002 mol, afterglow of $SrAl_2O_4$: Eu, Dy phosphorescent phosphor has a higher luminance than that of ZnS: Cu phosphor 30 minutes after excitation ceases. This fact indicates the effects of added Eu and Dy as an activator and a co-activator, respectively. Further, since Dy is expensive, if economy and deterioration in the afterglow characteristics due to concentration quenching are taken into consideration, addition of Dy at a proportion of 0.2 mol (20 mol %) or above is meaningless.

Further, since $SrAl_2O_4$: Eu, Dy phosphorescent phosphor is an oxide, it is chemically stable and shows excellent photo-resistance when compared with conventional sulfide phosphors (see Tables 24, 25).

TABLE 4

| Sample | Luminance 10 minutes after | Luminance 30 minutes after | Luminance 100 minutes after |
|---|---|---|---|
| ZnS: Cu Std | 1.00 | 1.00 | 1.00 |
| Sample 2-(1) | 12.5 | 19.6 | 37.0 |
| Sample 2-(2) | 0.943 | 1.57 | 2.00 |
| Sample 2-(3) | 1.5 | 1.7 | 2.1 |
| Sample 2-(4) | 11.7 | 17.3 | 22.1 |
| Sample 2-(5) | 20.4 | 28.8 | 40.2 |
| Sample 2-(6) | 18.6 | 26.3 | 36.4 |
| Sample 2-(7) | 1.95 | 2.66 | 3.30 |

Next, a phosphorescent phosphor which employs strontium as the metal element (M) and which employs europium as an activator and neodymium as a co-activator will be described as example 3 of the applied invention.

Example 3 of the Applied Invention: Synthesis of $SrAl_2O_4$: Eu, Nd phosphorescent phosphor and characteristics thereof Samples 3-(1) through 3-(7)

$SrAl_2O_4$: Eu, Nd phosphorescent phosphor samples having compositions shown in Table 5 were manufactured in the same manner as that described above with the exception that the proportion of neodymium was altered, as shown in Table 5.

TABLE 5

| | Material Mixing Ratio | | | |
|---|---|---|---|---|
| Sample | Strontium carbonate | Alumina | Europium | Neodymium |
| Sample 3- (1) | 0.98998 mol | 1.0 mol | 0.005 mol | 0.00001 mol |
| (2) | 0.9899 | 1.0 | 0.005 | 0.00005 |
| (3) | 0.985 | 1.0 | 0.005 | 0.0025 |
| (4) | 0.980 | 1.0 | 0.005 | 0.005 |
| (5) | 0.94 | 1.0 | 0.005 | 0.025 |
| (6) | 0.92 | 1.0 | 0.005 | 0.035 |
| (7) | 0.79 | 1.0 | 0.005 | 0.10 |

The results of the examination of the afterglow characteristics of these samples 3-(1) through 3-(7) are shown in Table 6.

TABLE 6

| Sample | Luminance 10 minutes after | Luminance 30 minutes after | Luminance 100 minutes after |
|---|---|---|---|
| ZnS: Cu Std. | 1.00 | 1.00 | 1.00 |
| Sample 3- (1) | 0.71 | 0.91 | 1.12 |
| (2) | 0.73 | 1.02 | 1.25 |
| (3) | 6.20 | 8.50 | 11.14 |
| (4) | 9.05 | 11.75 | 14.29 |
| (5) | 9.01 | 11.55 | 13.98 |
| (6) | 8.50 | 10.21 | 11.96 |
| (7) | 2.35 | 2.54 | 2.86 |

It can be seen from Table 6 that when the amount of added Nd as a co-activator is between 0.005 and 0.20 mol, $SrAl_2O_4$: Eu, Nd phosphorescent phosphor has a more excellent afterglow characteristic and a higher luminance 10 minutes after excitation than ZnS: Cu phosphor. However, even when the proportion of Nd is 0.00002 mol, afterglow of $SrAl_2O_4$: Eu, Nd phosphorescent phosphor has a higher luminance than that of ZnS: Cu phosphor 60 minutes after excitation ceases. This fact indicates the effects of added Eu and Nd as an activator and a co-activator, respectively. Further, since Nd is expensive, if economy and deterioration in the afterglow characteristics due to concentration quenching are taken into consideration, addition of Nd at a proportion of 0.2 mol (20 mol %) or above is meaningless.

Further, since $SrAl_2O_4$: Eu, Nd phosphorescent phosphor is an oxide, it is chemically stable and shows excellent photo-resistance when compared with conventional sulfide phosphors (see Tables 24, 25).

FIG. 7 shows the results of the examination of the thermo-luminescence characteristics (glow curves) of $SrAl_2O_4$ : Eu, Nd phosphorescent phosphor sample 3-(4) according to applied invention and previously irradiated which was conducted in a temperature range between the room temperature and 250° C. It can be seen from FIG. 7 that the main peak temperature of thermo-luminescence of the phosphorescent phosphor in which Nd is doped as a co-activator is about 50° C.

Next, a phosphorescent phosphor which employs strontium as the metal element (M), which employs europium as an activator and, which employs, as a co-activator, one element selected from a group consisting of lanthanum, cerium, praseodymium, samarium, gadolinium, terbium, holmium, erbium, thulium, ytterbium, lutetium, manganese, tin, bismuth will be described as example 4 of the applied invention.

In the case of europium, neodymium or dysprosium as an activator or a co-activator, addition thereof at a proportion of 0.01 mol relative to the metal element (M) assured the high afterglow luminance. With this fact taken into consideration, only the samples in which the Eu concentration of the activator is 1 mol % (0.01 mol) and the concentration of the co-activator is 1 mol % (0.01 mol) are shown.

Example 4 of Applied Invention: Advantage of doping of another co-activator to $SrAl_2O_4$: Eu phosphorescent phosphor Table 7 shows the results of the examination of the afterglow characteristics of the phosphorescent phosphor samples to which lanthanum, cerium, praseodymium, samarium, gadolinium, terbium, holmium, erbium, thulium, ytterbium, lutetium, manganese, tin and bismuth were added, respectively, as the co-activator.

As can be seen from Table 7, the afterglow characteristics of any of $SrAl_2O_4$: Eu phosphorescent phosphors doped with co-activators, improved as the time of more than 30 or 100 minutes elapsed after cessation of excitation, as compared with those of currently available ZnS: Cu phosphor which was used as the comparison, and were thus at a level which allowed the phosphorescent phosphor to be put into practical use.

Since $SrAl_2O_4$: Eu phosphorescent phosphor is an oxide, it is chemically stable and shows excellent photo-resistance when compared with conventional sulfide phosphors (see Tables 24, 25).

TABLE 7

| Sample | Luminance 10 minutes after | Luminance 30 minutes after | Luminance 100 minutes after |
|---|---|---|---|
| ZnS: Cu Std | 1.00 | 1.00 | 1.00 |
| $SrAl_2O_4$: Eu, La | 0.33 | 0.74 | 1.14 |
| $SrAl_2O_4$: Eu, Ce | 0.46 | 0.93 | 1.35 |
| $SrAl_2O_4$: Eu, Pr | 1.24 | 2.63 | 7.51 |
| $SrAl_2O_4$: Eu, Sm | 3.40 | 4.82 | 9.0 |
| $SrAl_2O_4$: Eu, Gd | 0.51 | 1.30 | 2.27 |
| $SrAl_2O_4$: Eu, Tb | 1.46 | 2.81 | 7.54 |
| $SrAl_2O_4$: Eu, Ho | 1.06 | 2.09 | 6.29 |
| $SrAl_2O_4$: Eu, Er | 0.63 | 1.43 | 3.18 |
| $SrAl_2O_4$: Eu, Tm | 0.81 | 1.53 | 3.28 |
| $SrAl_2O_4$: Eu, Yb | 0.61 | 1.28 | 2.99 |
| $SrAl_2O_4$: Eu, Lu | 0.49 | 1.01 | 3.40 |
| $SrAl_2O_4$: Eu, Mn | 0.81 | 1.86 | 5.57 |
| $SrAl_2O_4$: Eu, Sn | 1.93 | 3.61 | 7.92 |
| $SrAl_2O_4$: Eu, Bi | 0.72 | 1.77 | 5.55 |

Next, a phosphorescent phosphor, which employs calcium as the metal element (M), which employs europium as an activator and which employs no co-activator, and a phosphorescent phosphor which employs calcium as the metal element, which employs europium as an activator and which employs, as a co-activator, at least one element selected from a group consisting of lanthanum, cerium, praseodymium, neodymium, samarium, gadolinium, terbium, dysprosium, holmium, erbium, thulium, ytterbium, lutetium, manganese, tin and bismuth will be described below as example 5 of the applied invention.

Example 5 of the Applied Invention: Synthesis of $CaAl_2O_4$: Eu phosphorescent phosphor and characteristics thereof Europium oxide ($Eu_2O_3$) as an activator was doped to calcium carbonate having reagent grade and alumina having reagent grade and 5 g (0.08 mol) of boric acid was doped thereto as flux.

Europium oxide ($Eu_2O_3$) and either of lanthanum oxide, cerium oxide, praseodymium oxide, neodymium oxide, samarium oxide, gadolinium oxide, terbium oxide, dysprosium oxide, holmium oxide, erbium oxide, thulium oxide, ytterbium oxide, lutetium oxide, manganese oxide, tin oxide and bismuth oxide were added, as an activator and a co-activator respectively, to calcium carbonate having reagent grade and alumina having reagent grade and 5 g (0.08 mol) of boric acid was added thereto as flux. After the resultant mixture was sufficiently mixed using a ball mill, the sample was fired for 1 hour at 1300° C. in a stream of nitrogen-hydrogen mixture gas (97:3) (flow rate: 0.1 liter/min) using an electric furnace. Thereafter, the sample was cooled to a room temperature for about 1 hour. The obtained powder compound was sieved having 100 mesh to obtain phosphorescent phosphor sample 5-(1) through 5-(42).

FIG. 8 shows the results of analysis of the crystal structure of the obtained sample 5-(2) by XRD. It was discovered from the diffraction peak characteristics that the obtained phosphorescent phosphor was monoclinic $CaAl_2O_4$.

FIGS. 9A, 9B, and 10A and 10B respectively show the results of the examination of the thermo-luminescence characteristics (glow curves) of samples 5-(10), 5-(16), 5-(22) and 5-(28) which employed, as the co-activator, neodymium, samarium, dysprosium, and thulium, respectively. In either case, the glow curve has a peak in the high-temperature range of 50° C. or above. This implies that these phosphorescent phosphors have long-lasting afterglow characteristics. The emission spectrum of afterglow of each of the samples had a peak at about 442 nm, as shown in FIG. 11, and the color of afterglow was thus blue.

The afterglow characteristics of each of the samples were relatively compared with the afterglow characteristics of currently available CaSrS: Bi phosphorescent phosphor which emitted light of blue (manufactured by Nemoto Co., LTD trademark: BA-S, and the wavelength of emission peak: 454 nm) in Tables 8 through 13. As is apparent from Table 8, when the proportion of Eu in $CaAl_2O_4$: Eu phosphorescent phosphor is 0.01 mol (1.0 mol %), although the luminance of afterglow at an initial stage thereof is low, it increases substantially to that of the currently available phosphorescent phosphor 100 minutes after cessation of excitation. As shown in Tables 9 through 13, addition of a co-activator further increased the afterglow luminance. This happened whichever type of co-activator was employed. Particularly, addition of Nd, Sm and Tm was greatly effective, and thus provided a super high luminance blue emission color phosphorescent phosphor which was an order of magnitude brighter. FIG. 12 shows the results of the examination of the long-lasting afterglow of these high-luminance phosphorescent phosphors obtained by adding Nd, Sm and Tm as a co-activator.

In more detail, Table 8 shows the afterglow characteristics of phosphorescent phosphors which employ calcium and europium as the metal element (M) and the activator, respectively, and which employ no co-activator, the phosphorescent phosphors being shown in 5-(1) through 5(6).

TABLE 8

| Sample | Luminance 10 minutes after | Luminance 30 minutes after | Luminance 100 minutes after |
|---|---|---|---|
| Std. CaSrS: Bi | 1.00 | 1.00 | 1.00 |
| 5-(1) $CaAl_2O_4$: Eu (Eu: 0.001 mol %) | 0.18 | 0.16 | 0.14 |
| 5-(2) $CaAl_2O_4$: Eu (Eu: 0.01 mol %) | 0.21 | 0.18 | 0.17 |
| 5-(3) $CaAl_2O_4$: Eu (Eu: 0.1 mol %) | 0.25 | 0.27 | 0.35 |
| 5-(4) $CaAl_2O_4$: Eu (Eu: 0.5 mol %) | 0.41 | 0.60 | 0.90 |
| 5-(5) $CaAl_2O_4$: Eu (Eu: 2.5 mol %) | 0.37 | 0.45 | 0.65 |
| 5-(6) $CaAl_2O_4$: Eu (Eu: 10 mol %) | 0.25 | 0.28 | 0.39 |

Table 9 shows the afterglow characteristics of phosphorescent phosphors which employ calcium, europium and neodymium as the metal element (M), the activator, and the co-activator, respectively, the phosphorescent phosphors being shown in 5-(7) through 5-(12).

TABLE 9

| Sample | Luminance 10 minutes after | Luminance 30 minutes after | Luminance 100 minutes after |
|---|---|---|---|
| Std. CaSrS: Bi | 1.00 | 1.00 | 1.00 |
| 5-(7) $CaAl_2O_4$: Eu, Nd (Eu: 0.5 mol % Nd: 0.001 mol %) | 0.53 | 0.78 | 1.01 |
| 5-(8) $CaAl_2O_4$: Eu, Nd (Eu: 0.5 mol % Nd: 0.01 mol %) | 1.05 | 1.53 | 2.60 |
| 5-(9) $CaAl_2O_4$: Eu, Nd (Eu: 0.5 mol % Nd: 0.1 mol %) | 8.68 | 11.8 | 20.3 |
| 5-(10) $CaAl_2O_4$: Eu, Nd (Eu: 0.5 mol % Nd: 0.5 mol %) | 9.87 | 14.0 | 25.0 |
| 5-(11) $CaAl_2O_4$: Eu, Nd (Eu: 0.5 mol % Nd: 2.5 mol %) | 3.18 | 4.51 | 8.05 |
| 5-(12) $CaAl_2O_4$: Eu, Nd (Eu: 0.5 mol % Nd: 10 mol %) | 0.84 | 1.18 | 2.02 |

Table 10 shows the afterglow characteristics of phosphorescent phosphors which employ calcium, europium and samarium as the metal element (M), the activator, and the co-activator, respectively, the phosphorescent phosphors being shown in 5-(13) through 5-(18).

TABLE 10

| Sample | Luminance 10 minutes after | Luminance 30 minutes after | Luminance 100 minutes after |
|---|---|---|---|
| Std. CaSrS: Bi | 1.00 | 1.00 | 1.00 |
| 5-(13) $CaAl_2O_4$: Eu, Sm (Eu: 0.5 mol % Sm: 0.001 mol %) | 0.71 | 0.98 | 1.23 |
| 5-(14) $CaAl_2O_4$: Eu, Sm (Eu: 0.5 mol % Sm: 0.01 mol %) | 0.94 | 1.43 | 2.55 |
| 5-(15) $CaAl_2O_4$: Eu, Sm (Eu: 0.5 mol % Sm: 0.1 mol %) | 4.21 | 6.32 | 11.30 |
| 5-(16) $CaAl_2O_4$: Eu, Sm (Eu: 0.5 mol % Sm: 0.5 mol %) | 4.61 | 7.00 | 12.5 |
| 5-(17) $CaAl_2O_4$: Eu, Sm (Eu: 0.5 mol % Sm: 2.5 mol %) | 2.14 | 3.25 | 5.80 |
| 5-(18) $CaAl_2O_4$: Eu, Sm (Eu: 0.5 mol % Sm: 10 mol %) | 0.63 | 0.96 | 1.71 |

Table 11 shows the afterglow characteristics of phosphorescent phosphors which employ calcium, europium and dysprosium as the metal element (M), the activator, and the co-activator, respectively, the phosphorescent phosphors being shown in 5-(19) through 5-(24).

TABLE 11

| Sample | Luminance 10 minutes after | Luminance 30 minutes after | Luminance 100 minutes after |
|---|---|---|---|
| Std. CaSrS: Bi | 1.00 | 1.00 | 1.00 |
| 5-(19) $CaAl_2O_4$: Eu, Dy (Eu: 0.5 mol % Dy: 0.001 mol %) | 0.30 | 0.24 | 0.20 |
| 5-(20) $CaAl_2O_4$: Eu, Dy (Eu: 0.5 mol % Dy: 0.01 mol %) | 0.41 | 0.39 | 0.35 |
| 5-(21) $CaAl_2O_4$: Eu, Dy (Eu: 0.5 mol % Dy: 0.1 mol %) | 0.52 | 0.60 | 0.76 |
| 5-(22) $CaAl_2O_4$: Eu, Dy (Eu: 0.5 mol % Dy: 0.5 mol %) | 0.76 | 0.90 | 1.25 |
| 5-(23) $CaAl_2O_4$: Eu, Dy (Eu: 0.5 mol % Dy: 2.5 mol %) | 0.84 | 1.18 | 1.76 |

TABLE 11-continued

| Sample | Luminance 10 minutes after | Luminance 30 minutes after | Luminance 100 minutes after |
|---|---|---|---|
| 5-(24) CaAl$_2$O$_4$: Eu, Dy (Eu: 0.5 mol % Dy:10 mol %) | 0.50 | 0.58 | 0.76 |

Table 12 shows the afterglow characteristics of phosphorescent phosphors which employ calcium, europium and thulium as the metal element (M), the activator, and the co-activator, respectively, the phosphorescent phosphors being shown in 5-(25) through 5-(30).

TABLE 12

| Sample | Luminance 10 minutes after | Luminance 30 minutes after | Luminance 100 minutes after |
|---|---|---|---|
| Std. CaSrS: Bi | 1.00 | 1.00 | 1.00 |
| 5-(25) CaAl$_2$O$_4$: Eu, Tm (Eu: 0.5 mol % Dy: 0.001 mol %) | 1.04 | 1.36 | 1.81 |
| 5-(26) CaAl$_2$O$_4$: Eu, Tm (Eu: 0.5 mol % Tm: 0.01 mol %) | 2.09 | 2.65 | 3.75 |
| 5-(27) CaAl$_2$O$_4$: Eu, Tm (Eu: 0.5 mol % Tm: 0.1 mol %) | 4.89 | 5.78 | 8.70 |
| 5-(28) CaAl$_2$O$_4$: Eu, Tm (Eu: 0.5 mol % Tm: 0.5 mol %) | 6.55 | 9.04 | 18.6 |
| 5-(29) CaAl$_2$O$_4$: Eu, Tm (Eu: 0.5 mol % Tm: 2.5 mol %) | 0.634 | 1.19 | 2.68 |
| 5-(30) CaAl$_2$O$_4$: Eu, Tm (Eu: 0.5 mol % Tm:10 mol %) | 0.151 | 0.358 | 0.755 |

Table 13 shows the afterglow characteristics of phosphorescent phosphors which employ calcium, europium and either of lanthanum, cerium, praseodymium, gadolinium, terbium, holmium, erbium, ytterbium, lutetium, manganese, tin and bismuth as the metal element (M), the activator, and the co-activator, respectively, the phosphorescent phosphors being shown in 5-(31) through 5-(42).

1 mol % of europium as the activator and another co-activator were each doped to the phosphorescent phosphors shown in 5-(31) through 5-(42).

TABLE 13

| Sample | Luminance 10 minutes after | Luminance 30 minutes after | Luminance 100 minutes after |
|---|---|---|---|
| Std. CaSrS: Bi | 1.00 | 1.00 | 1.00 |
| (31) CaAl$_2$O$_4$: Eu, La (Eu: 0.5 mol % La: 0.5 mol %) | 0.52 | 0.67 | 0.81 |
| (32) CaAl$_2$O$_4$: Eu, Ce (Eu: 0.5 mol % Ce: 0.5 mol %) | 0.84 | 1.23 | 1.96 |
| (33) CaAl$_2$O$_4$: Eu, Pr (Eu: 0.5 mol % Pr: 0.5 mol %) | 0.5 | 0.82 | 1.13 |
| (34) CaAl$_2$O$_4$: Eu, Gd (Eu: 0.5 mol % Gd: 0.5 mol %) | 0.66 | 0.91 | 1.26 |
| (35) CaAl$_2$O$_4$: Eu, Tb (Eu: 0.5 mol % Tb: 0.5 mol %) | 0.84 | 1.31 | 2.08 |
| (36) CaAl$_2$O$_4$: Eu, Ho (Eu: 0.5 mol % Ho: 0.5 mol %) | 0.98 | 1.33 | 2.39 |
| (37) CaAl$_2$O$_4$: Eu, Er (Eu: 0.5 mol % Er: 0.5 mol %) | 0.56 | 0.76 | 0.98 |
| (38) CaAl$_2$O$_4$: Eu, Yb (Eu: 0.5 mol % Yb: 0.5 mol %) | 0.70 | 0.91 | 1.28 |

TABLE 13-continued

| Sample | Luminance 10 minutes after | Luminance 30 minutes after | Luminance 100 minutes after |
|---|---|---|---|
| (39) CaAl$_2$O$_4$: Eu, Lu (Eu: 0.5 mol % Lu: 0.5 mol %) | 0.68 | 0.90 | 1.24 |
| (40) CaAl$_2$O$_4$: Eu, Mn (Eu: 0.5 mol % Mn: 0.5 mol %) | 0.31 | 0.42 | 0.58 |
| (41) CaAl$_2$O$_4$: Eu, Sn (Eu: 0.5 mol % Sn: 0.5 mol %) | 0.45 | 0.58 | 0.73 |
| (42) CaAl$_2$O$_4$: Eu, Bi (Eu: 0.5 mol % Bi: 0.5 mol %) | 0.25 | 0.33 | 0.48 |

Next, a phosphorescent phosphor which employs, calcium europium and neodymium as the metal element (M), the activator and the co-activator, respectively while another co-activator is added thereto at the same time will be described as example 6.

Example 6 of Applied Invention Synthesis of CaAl$_2$O$_4$: Eu, Nd phosphorescent phosphor and characteristics thereof Europium oxide (Eu$_2$O$_3$) as an activator and neodynrium as a co-activator were added to calcium carbonate having reagent grade and alumina having reagent grade and 5 g (0.08 mol) of boric acid was added thereto as flux.

Europium oxide (Eu$_2$O$_3$) as an activator, neodymium as a co-activator, and further, either of lanthanum oxide, cerium oxide, praseodymium oxide, samarium oxide, gadolinium oxide, terbium oxide, dysprosium oxide, holmium oxide, erbium oxide, thulium oxide, ytterbium oxide, lutetium oxide, manganese oxide, tin oxide and bismuth oxide except neodymium oxide as another co-activator were doped to calcium carbonate having reagent grade and alumina having reagent grade and 5 g (0.08 mol) of boric acid was added thereto as flux. After the resultant mixture was sufficiently mixed using a ball mill, the sample was fired for 1 hour at 1300° C. in a stream of nitrogen-hydrogen mixture gas (97:3) (flow rate: 0.1 liter/min) using an electric furnace. Thereafter, the sample was cooled to a room temperature for about 1 hour. The obtained powder compound was sieved having 100 mesh to obtain phosphorescent phosphor sample 6-(1) through 6-(43).

Various samples were manufactured with 1 mol % of Eu, 1 mol % of Nd and 1 mol % of another co-activator and the afterglow luminances 10 minutes, 30 minutes and 100 minutes after excitation were measured. Table 14 shows the results in 6-(1) through 6-(15).

TABLE 14

| Sample | Luminance 10 minutes after | Luminance 30 minutes after | Luminance 100 minutes after |
|---|---|---|---|
| Std. CaSrS: Bi | 1.0 | 1.0 | 1.0 |
| CaAl$_2$O$_4$: Eu, Nd | 9.87 | 14.0 | 25.0 |
| 6-(1) CaAl$_2$O$_4$: Eu, Nd, La | 20.6 | 23.2 | 29.5 |
| (2) CaAl$_2$O$_4$: Eu, Nd, Ce | 12.7 | 17.5 | 26.9 |
| (3) CaAl$_2$O$_4$: Eu, Nd, Pr | 13.3 | 18.1 | 27.7 |
| (4) CaAl$_2$O$_4$: Eu, Nd, Sm | 8.20 | 12.6 | 22.6 |
| (5) CaAl$_2$O$_4$: Eu, Nd, Gd | 16.7 | 21.3 | 33.5 |
| (6) CaAl$_2$O$_4$: Eu, Nd, Tb | 13.8 | 17.2 | 25.5 |
| (7) CaAl$_2$O$_4$: Eu, Nd, Dy | 14.8 | 18.9 | 30.8 |
| (8) CaAl$_2$O$_4$: Eu, Nd, Ho | 16.5 | 21.6 | 34.3 |
| (9) CaAl$_2$O$_4$: Eu, Nd, Er | 15.9 | 21.0 | 33.8 |
| (10) CaAl$_2$O$_4$: Eu, Nd, Tm | 4.17 | 6.69 | 13.4 |
| (11) CaAl$_2$O$_4$: Eu, Nd, Yb | 11.0 | 16.9 | 27.9 |
| (12) CaAl$_2$O$_4$: Eu, Nd, Lu | 10.2 | 15.2 | 25.2 |

TABLE 14-continued

| Sample | Luminance 10 minutes after | Luminance 30 minutes after | Luminance 100 minutes after |
|---|---|---|---|
| (13) $CaAl_2O_4$: Eu, Nd, Mn | 6.45 | 8.01 | 11.9 |
| (14) $CaAl_2O_4$: Eu, Nd, Sn | 11.4 | 14.1 | 21.2 |
| (15) $CaAl_2O_4$: Eu, Nd, Bi | 10.6 | 13.5 | 21.4 |

It was recognized from the result of the measurement that the co-activators doped together with neodymium which have a particularly. excellent afterglow luminance, were lanthanum, dysprosium, gadolinium, holmium, erbium and the like.

Then, with 1 mol % of Eu and 1 mol % of Nd, the concentration of lanthanum was changed from 0.2 mol % to 20 mol %. Table 15 shows the result of the experiment in 6-(16) through 6-(21).

TABLE 15

| Sample | Luminance 10 minutes after | Luminance 30 minutes after | Luminance 100 minutes after |
|---|---|---|---|
| Std. CaSrS: Bi | 1.0 | 1.0 | 1.0 |
| (16) $CaAl_2O_4$: Eu, Nd (Eu: 0.5 mol % Nd: 0.5 mol %) | 9.87 | 14.0 | 25.0 |
| (17) $CaAl_2O_4$: Eu, Nd, La (Eu: 0.5 mol % Nd: 0.5 mol % La: 0.1 mol %) | 14.1 | 18.2 | 29.3 |
| (18) $CaAl_2O_4$: Eu, Nd, La (Eu: 0.5 mol % Nd: 0.5 mol % La: 0.3 mol %) | 15.5 | 18.9 | 28.S |
| (1) $CaAl_2O_4$: Eu, Nd, La (Eu: 0.5 mol % Nd: 0.5 mol % La: 0.5 mol %) | 20.6 | 23.2 | 29.5 |
| (19) $CaAl_2O_4$: Eu, Nd,La (Eu: 0.5 mol % Nd: 0.5 mol % La: 1.0 mol %) | 1.42 | 1.05 | 0.858 |
| (20) $CaAl_2O_4$: Eu, Nd, La (Eu: 0.5 mol % Nd: 0.5 mol % Ca: 2.0 mol %) | | Measurement Limit | |
| (21) $CaAl_2O_4$: Eu, Nd, La (Eu: 0.5 mol % Nd: 0.5 mol % La: 10 mol %) | | Measurement Limit | |

With 1 mol % of Eu and 1 mol % of Nd, the concentration of dysprosium was changed from 0.2 mol % to 20 mol %. Table 16 shows the result of the experiment in 6-(22) through 6-(27).

TABLE 16

| Sample | Luminance 10 minutes after | Luminance 30 minutes after | Luminance 100 minutes after |
|---|---|---|---|
| Std. CaSrS: Bi | 1.0 | 1.0 | 1.0 |
| (22) $CaAl_2O_4$: Eu, Nd (Eu: 0.5 mol % Nd: 0.5 mol %) | 9.87 | 14.0 | 25.0 |
| (23) $CaAl_2O_4$: Eu, Nd, Dy (Eu: 0.5 mol % Nd: 0.5 mol % Dy: 0.1 mol %) | 4.32 | 6.76 | 12.0 |
| (24) $CaAl_2O_4$: Eu, Nd, Dy (Eu: 0.5 mol % Nd: 0.5 mol % Dy: 0.3 mol %) | 8.91 | 14.0 | 24.2 |
| (7) $CaAl_2O_4$: Eu, Nd, Dy (Eu: 0.5 mol % Nd: 0.5 mol % Dy: 0.5 mol %) | 14.8 | 18.9 | 30.8 |
| (25) $CaAl_2O_4$: Eu, Nd, Dy (Eu: 0.5 mol % Nd: 0.5 mol % Dy: 1.0 mol %) | 12.1 | 18.3 | 27.8 |
| (26) $CaAl_2O_4$: Eu, Nd, Dy (Eu: 0.5 mol % Nd: 0.5 mol % Dy: 2.0 mol %) | 7.49 | 10.3 | 16.0 |
| (27) $CaAl_2O_4$: Eu, Nd, Dy (Eu: 0.5 mol % Nd: 0.5 mol % Dy: 10 mol %) | 1.84 | 1.29 | 0.998 |

With 1 mol % of Eu and 1 mol % of Nd, the concentration of gadolinium was changed from 0.2 mol % to 20 mol %. Table 17 shows the result of the experiment in 6-(28) through 6-(32).

TABLE 17

| Sample | Luminance 10 minutes after | Luminance 30 minutes after | Luminance 100 minutes after |
| --- | --- | --- | --- |
| Std. CaSrS: Bi | 1.0 | 1.0 | 1.0 |
| $CaAl_2O_4$: Eu, Nd (Eu: 0.5 mol % Nd: 0.5 mol %) | 9.87 | 14.0 | 25.0 |
| (28) $CaAl_2O_4$: Eu, Nd, Gd (Eu: 0.5 mol % Nd: 0.5 mol % Gd: 0.1 mol %) | 11.8 | 17.4 | 30.0 |
| (29) $CaAl_2O_4$: Eu, Nd, Gd (Eu: 0.5 mol % Nd; 0.5 mol % Gd: 0.3 mol %) | 12.7 | 17.8 | 29.8 |
| (5) $CaAl_2O_4$: Eu, Nd, Gd (Eu: 0.5 mol % Nd: 0.5 mol % Gd: 0.5 mol %) | 16.7 | 21.3 | 33.S |
| (30) $CaAl_2O_4$: Eu, Nd, Gd (Eu: 0.5 ml% Nd: 0.5 mol % Gd: 1.0 mol %) | 10.8 | 15.7 | 26.5 |
| (31) $CaAl_2O_4$: Eu, Nd, Gd (Eu: 0.5 mol % Nd: 0.5 mol % Gd: 2.0 mol %) | 18.0 | 21.7 | 29.5 |
| (32) $CaAl_2O_4$: Eu, Nd, Gd (Eu: 0.5 mol % Nd: 0.5 mol % Gd: 10 mol %) | 1.01 | 0.764 | 0.590 |

With 1 mol % of Eu and 1 mol % of Nd, the concentration of holmium was changed from 0.2 mol % to 20 mol %. Table 18 shows the result of the experiment in 6-(33) through 6-(37).

TABLE 18

| Sample | Luminance 10 minutes after | Luminance 30 minutes after | Luminance 100 minutes after |
| --- | --- | --- | --- |
| Std. CaSrS: Bi | 1.0 | 1.0 | 1.0 |
| $CaAl_2O_4$: Eu, Nd (Eu: 0.5 mol % Nd: 0.5 mol %) | 9.87 | 14.0 | 25.0 |
| (33) $CaAl_2O_4$: Eu, Nd, Ho (Eu: 0.5 mol % Nd: 0.5 mol % Nd: 0.1 mol %) | 10.4 | 14.4 | 25.3 |
| (34) $CaAl_2O_4$: Eu, Nd, Ho (Eu: 0.5 mol % Nd: 0.5 mol % Ho: 0.3 mol %) | 12.0 | 16.2 | 27.0 |
| (8) $CaAl_2O_4$: Eu, Nd, Ho (Eu: 0.5 mol % Nd: 0.5 mol % Ho 0.5 mol %) | 16.5 | 21.6 | 34.3 |
| (35) $CaAl_2O_4$: Eu, Nd, Ho (Eu: 0.5 mol % Nd: 0.5 mol % Ho: 1.0 mol %) | 13.4 | 16.9 | 26.3 |
| (36) $CaAl_2O_4$: Eu, Nd, Ho (Eu: 0.5 mol % Nd: 0.5 mol % Ho: 2.0 mol %) | 13.3 | 16.0 | 23.S |
| (37) $CaAl_2O_4$: Eu, Nd, Ho (Eu: 0.5 mol % Nod: 0.5 mol % Ho: 10 mol %) | 1.20 | 0.914 | 0.782 |

With 1 mol % of Eu and 1 mol % of Nd, the concentration of erbium was changed from 0.2 mol % to 10 mol %. Table 19 shows the result of the experiment in 6-(38) through 6-(43).

TABLE 19

| Sample | Luminance 10 minutes after | Luminance 30 minutes after | Luminance 100 minutes after |
| --- | --- | --- | --- |
| Std. CaSrS: Bi | 1.0 | 1.0 | 1.0 |
| $CaAl_2O_4$: Eu, Nd (Eu; 0.5 mol % Nd: 0.5 mol %) | 9.87 | 14.0 | 25.0 |
| (38) $CaAl_2O_4$: Eu, Nd, Er (Eu: 0.5 mol % Nd: 0.5 mol % Er: 0.1 mol %) | 10.7 | 15.1 | 27.0 |
| (39) $CaAl_2O_4$: Eu, Nd, Er (Eu: 0.5 mol % Nd: 0.5 mol % Er: 0.3 mol %) | 10.3 | 14.0 | 24.0 |
| (9) $CaAl_2O_4$: Eu, Nd, Er (Eu: 0.5 mol % Nd; 0.5 mol % Er, 0.5 mol %) | 15.9 | 21.0 | 33.8 |
| (40) $CaAl_2O_4$: Eu, Nd, Er (Eu: 0.5 mol % Nd: 0.5 mol % Er: 1.0 mol %) | 16.4 | 21.1 | 32.3 |
| (41) $CaAl_2O_4$: Eu, Nd, Er | 17.3 | 21.7 | 30.8 |

TABLE 19-continued

| Sample | Luminance 10 minutes after | Luminance 30 minutes after | Luminance 100 minutes after |
| --- | --- | --- | --- |
| (Eu: 0.5 mol % Id: 0.5 mol % Er: 2.0 mol %) | | | |
| (42) $CaAl_2O_4$: Eu, Nd, Er | 20.1 | 21.3 | 28.5 |
| (Eu: 0.5 ml % Nd: 0.5 mol % Er: 3.0 mol %) | | | |
| (43) $CaAl_2O_4$: Eu, Nd, Er | 17.5 | 17.8 | 22.0 |
| (Eu: 0.5 mol % Nd: 0.5 mol % Er: 5.0 mol %) | | | |

It was recognized from the results of the measurements that certain mixtures of the co-activators improved the afterglow luminance. Further, it was also recognized that the sample had the most excellent afterglow characteristics when, with 1 mol % of Eu and 1 mol % of Nd, about 1 mol % of another co-activator was added.

Next, a phosphorescent phosphor which employs barium, europium and neodymium as the metal element (M), an activator and a co-activator, respectively, will be described as example 7 of the applied invention.

Example 7 of Applied Invention $BaAl_2O_4$: Eu phosphorescent phosphor

After 1 mol % of Eu was added to the phosphorescent phosphor, further 1 mol % of Nd or Sm was added thereto. The results are shown in 7-(1) and 7-(2).

FIGS. 13A and 13B respectively shows the excitation spectrum of the phosphorescent phosphor which employs neodymium as the co-activator and the afterglow emission spectrum thereof obtained 30 minutes after excitation is ceased.

FIGS. 14A and 14B respectively show the excitation spectrum of the phosphorescent phosphor which employs samarium as the co-activator and the afterglow emission spectrum thereof obtained 30 minutes after excitation is ceased.

The peak wavelength of emission spectrum is always about 500 nm, the emission spectrum emitting light of green. Table 20 shows the results of the comparison between the afterglow characteristics of the obtained $BaAl_2O_4$: Eu phosphorescent phosphor and those of ZnS: Cu phosphor which is available on the market and which emits light of green (manufactured by Nemoto & Co., LTD. GSS, and the wavelength of emission peak: 530 nm), indicating relative values of the afterglow intensities 10 minutes, 30 minutes and 100 minutes after excitation is ceased.

TABLE 20

| Sample | Luminance 10 minutes after | Luminance 30 minutes after | Luminance 100 minutes after |
| --- | --- | --- | --- |
| Std.ZnS: Cu | 1.0 | 1.0 | 1.0 |
| $BaAl_2O_4$: Eu, Nd (Eu: 0.5 mol % Nd: 0.5 mol %) | 1.23 | 1.14 | 0.885 |
| $BaAl_2O_4$: Eu, Sm (Eu: 0.5 mol % Sm: 0.5 mol %) | 0.982 | 0.911 | 0.768 |

Table 20 shows that $BaAl_2O_4$: Eu, Nd has a more excellent afterglow luminance than ZnS: Cu phosphor for about 30 minutes after excitation is ceased. It was found that $BaAl_2O_4$: Eu, Sm had a little lower afterglow luminance than ZnS: Cu phosphor. However, it has been confirmed that no fluorescence or afterglow is recognized as a result of experiments with only $BaAl_2O_4$ crystal without adding Eu or other co-activator thereto. Therefore, it is evident that the effects of activation can be assured by doping Eu, Nd or Sm to $BaAl_2O_4$ phosphorescent phosphor.

Since $BaAl_2O_4$: Eu phosphorescent phosphor is an oxide, it is chemically stable and shows excellent photo-resistance when compared with conventional sulfide phosphors (see Tables 24, 25).

Next, a phosphorescent phosphor which employs, as the metal element(M), a mixture of calcium and strontium will be described as example 8 of the applied invention.

Example 8 of Applied Invention Synthesis of $Sr_xCa_{1-x}Al_2O_4$ phosphorescent phosphor and characteristics thereof Strontium carbonate having reagent grade and calcium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin and bismuth were added to each of the samples as the activator and the co-activator, respectively, and additionally, 5 g (0.08 mol) of boric acid was added thereto as flux to obtain $Sr_xCa_{1-x}Al_2O_4$ phosphorescent phosphor samples in the manner described above.

FIG. 15 shows the results of the examination of the afterglow emission spectrum of Sr0.5Ca0.5$Al_2O_4$: Eu, Dy phosphorescent phosphor (Eu 1 mol %, Dy 1 mol %). It is apparent from FIG. 15 that when Ca is substituted for a part of Sr, the emission wavelength is reduced and thus produces an afterglow having a color between that obtained by emission of $SrAl_2O_4$ phosphorescent phosphor and that obtained by emission of $CaAl_2O_4$ phosphorescent phosphor.

FIG. 16 shows the results of the examination of the afterglow characteristics of $Sr_xCa_{1-x}Al_2O_4$ phosphorescent phosphor samples in which 1 mol % of Eu and 1 mol % of Dy were added as the activator and the co-activator, respectively.

As can be seen from FIG. 16, any of these phosphorescent phosphors shows excellent afterglow characteristics and is thus practically applicable as compared with the currently available phosphorescent phosphors shown by the broken line in FIG. 16.

Next, a phosphorescent phosphor which employs, as the metal element (M), a mixture of strontium and barium will be described as example 9 of the applied invention.

Example 9 of Applied Invention Synthesis of $Sr_xBa_{1-x}Al_2O_4$ phosphorescent phosphor and characteristics thereof Strontium carbonate having reagent grade and barium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin and bismuth were added to each of the samples as the activator and the co-activator, respectively, and 5 g (0.08 mol) of boric acid was added thereto as flux to obtain $Sr_xBa_{1-x}Al_2O_4$ phosphorescent phosphor samples in the manner described above.

FIG. 17 shows the results of the examination of the afterglow characteristics of $Sr_xBa_{1-x}Al_2O_4$ phosphorescent phosphors to which 1 mol % of Eu and 1 mol % of Dy were added.

As can be seen from FIG. 17, any of these phosphorescent phosphors shows excellent afterglow characteristics and is thus practically applicable as compared with the currently available phosphor shown by the broken line in FIG. 17.

Next, a phosphorescent phosphor which employs, as the metal element (M), a mixture of strontium and magnesium will be described as example 10 of the applied invention.

Example 10 of Applied Invention Synthesis of $Sr_xMg_{1-x}Al_2O_4$ phosphorescent phosphor and characteristics thereof Strontium carbonate having reagent grade and magnesium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin, and bismuth were added to each of the samples as the activator and the co-activator, respectively, and additionally, 5 g (0.08 mol) of boric acid was added thereto as flux to obtain $Sr_xMg_{1-x}Al_2O_4$ phosphorescent phosphor samples in the manner described above.

FIG. 18 shows the results of the examination of the afterglow characteristics of $Sr_xMg_{1-x}Al_2O_4$ phosphorescent phosphors to which 1 mol % of Eu and 1 mol % of Dy were added.

As can be seen from FIG. 18, any of these phosphorescent phosphors shows excellent afterglow characteristics and is thus practically applicable except for the phosphorescent phosphors in which the ratio between strontium and magnesium was 0.1/0.9, as compared with the currently available phosphorescent phosphor shown by the broken line in FIG. 18.

Next, a phosphorescent phosphor which employs a plurality of metal elements and europium as the metal element (M) and an activator, respectively and further two types of co-activators, will be described as example 11 of the applied invention.

Example 11 of Applied Invention Synthesis of $Ca_{1-x}Sr_xAl_2O_4$: Eu, Nd, X phosphorescent phosphor and characteristics thereof.

Strontium carbonate having reagent grade and calcium carbonate having reagent grade were mixed with each other at different ratios. Alumina was added to each of the obtained samples. Also, 1 mol % of europium, 1 mol % of neodymium and further, 1 mol % of either of lanthanum, dysprosium and holmium were added to each of the samples as the activator, the co-activator and another co-activator, respectively, and 5 g (0.08 mol) of boric acid was added thereto as flux to obtain $Ca_{1-x}Sr_xAl_2O_4$: Eu, Nd, X phosphorescent phosphor samples 11-(1) through 11-(9) in the manner described above. Then, the afterglow characteristics of the samples were examined.

Strontium carbonate having reagent grade and calcium carbonate having reagent grade were mixed with each other at different ratios. Alumina was added to each of the obtained samples. Also, 1 mol % of europium, 1 mol % of neodymium and further, 1 mol % of lanthanum were added to each of the samples as the activator, the co-activator and another co-activator, respectively, to obtain the samples 11-(1) through 11-(3) shown in Table 21.

TABLE 21

| Sample | Luminance 10 minutes after | Luminance 30 minutes after | Luminance 100 minutes after |
|---|---|---|---|
| Std.CaSrS: Bi | 1.0 | 1.0 | 1.0 |
| CaAl$_2$O$_4$: Eu, Nd | 9.87 | 14.0 | 25.0 |
| 11-(1) (Ca$_{0.9}$ SR$_{0.1}$)Al$_2$O$_4$: Eu, Nd, La | 15.2 | 17.1 | 19.0 |
| (2) (Ca$_{0.7}$ SR$_{0.3}$)Al$_2$O$_4$: Eu, Nd, La | 5.53 | 4.96 | 3.35 |
| (3) (Ca$_{0.5}$ SR$_{0.5}$)Al$_2$O$_4$: Eu, Nu, La | 6.30 | 3.08 | Measurement limit |

Strontium carbonate having reagent grade and calcium carbonate having reagent grade were mixed with each other at different ratios. Alumina was added to each of the obtained samples. Also, 1 mol % of europium, 1 mol % of neodymium and further, 1 mol % of dysprosium were added to each of the samples as the activator, the co-activator and another co-activator, respectively, to obtain the samples 11-(4) through 11-(6) shown in Table 22.

TABLE 22

| Sample | Luminance 10 minutes after | Luminance 30 minutes after | Luminance 100 minutes after |
|---|---|---|---|
| Std.CaSrS: Bi | 1.0 | 1.0 | 1.0 |
| CaAl$_2$O$_4$: Eu, Nd | 9.87 | 14.0 | 25.0 |
| (4) (Ca$_{0.9}$ Sr$_{0.1}$)Al$_2$O$_4$: Eu, Nd, Dy | 13.2 | 14.6 | 20.4 |
| (5) (Ca$_{0.7}$ Sr$_{0.3}$)Al$_2$O$_4$: Eu, Nd, Dy | 8.00 | 7.46 | 9.05 |
| (6) (Ca$_{0.5}$ Sr$_{0.5}$)Al$_2$O$_4$: Eu, Nd, Dy | 3.36 | 3.08 | Measurement limit |

Strontium carbonate having reagent grade and calcium carbonate having reagent grade were mixed with each other at different ratios. Alumina was added to each of the obtained samples. Also, 1 mol % of europium, 1 mol % of neodymium and further, 1 mol % of holmium were added to each of the samples as the activator, the co-activator and another co-activator, respectively, to obtain the samples 11-(7) through 11-(9) shown in Table 23.

TABLE 23

| Sample | Luminance 10 minutes after | Luminance 30 minutes after | Luminance 100 minutes after |
|---|---|---|---|
| Std.CaSrS: Bi | 1.0 | 1.0 | 1.0 |
| CaAl$_2$O$_4$: Eu, Nd | 9.87 | 14.0 | 25.0 |
| (7) (Ca$_{0.9}$ Sr$_{0.1}$)Al$_2$O$_4$: Eu, Nd, Ho | 13.9 | 15.3 | 21.4 |
| (8) (Ca$_{0.7}$ Sr$_{0.3}$)Al$_2$O$_4$: Eu, Nd, Ho | 8.25 | 7.81 | 9.95 |
| (9) (Ca$_{0.5}$ Sr$_{0.5}$)Al$_2$O$_4$: Eu, Nd, Ho | 2.91 | 2.62 | 3.65 |

As can be seen from the results of the measurement, the phosphorescent phosphors which employ calcium and strontium as the metal element (M), employ europium as the activator and employ a plurality of co-activators shows excellent afterglow characteristics than CaSrS: Bi and further the luminance 10 minutes after excitation was more excellent than CaSrS: Bi.

Example 12 of Applied Invention Humidity test

Table 24 shows the results of the examination of moisture resistance characteristics of phosphorescent phosphor obtained according to the present invention.

In the humidity test, a plurality of phosphorescent phosphor samples were left for 500 hours in a constant temperature and humidity bath which was adjusted to 40° C. and 95% RH, and the resultant changes in the luminance of each of the samples were measured.

As can be seen from Table 24, none of the samples was affected by humidity and the samples were thus stable.

TABLE 24

| Sample | Before test | After test |
| --- | --- | --- |
| $SrAl_2O_4$: Eu, Dy (Eu: 0.5 mol % Dy: 0.5 mol %) | 1.0 | 1.01 |
| $CaAl_2O_4$: Eu, Nd (Eu: 0.5 mol % Nd: 0.5 mol %) | 1.0 | 0.99 |
| $Sr0.5Ca0.5Al_2O_4$: Eu, Dy (Eu: 0.5 mol % Dy: 0.5 mol %) | 1.0 | 1.00 |
| $Sr0.5Ba0.5Al_2O_4$: Eu, Dy (Eu: 0.5 mol % Dy: 0.5 mol %) | 1.0 | 0.99 |
| $Sr0.5Mg0.5Al_2O_4$: Eu, Dy (Eu: 0.5 mol % Dy: 0.5 mol %) | 1.0 | 1.02 |

Example 13 of Applied Invention Photo resistance test

FIG. 25 shows the results of the photo resistance test conducted on the phosphorescent phosphors according to the present invention together with the results obtained from zinc sulfide phosphor.

This test was conducted conforming to JIS standard on the sample placed in a transparent container whose humidity was adjusted to saturated humidity by irradiating the sample by a mercury lamp of 300 W located at 30 cm above the sample for 3 hours, 6 hours and 12 hours, respectively, and by measuring changes in the luminance caused by irradiation.

As can be seen from Table 25, phosphorescent phosphors according to the present invention are very stable as compared with conventional zinc sulfide phosphor.

TABLE 25

| Sample | Before test | 3 hours after | 6 hours after | 12 hours after |
| --- | --- | --- | --- | --- |
| Std. ZnS: Cu | 1.0 | 0.91 | 0.82 | 0.52 |
| $SrAl_2O_4$: Eu, Dy (Eu: 0.5 mol % Dy: 0.5 mol %) | 1.0 | 1.01 | 1.00 | 1.01 |
| $CaAl_2O_4$: Eu, Nd (Eu: 0.5 mol % Nd: 0.5 mol %) | 1.0 | 1.00 | 1.01 | 1.00 |
| $Sr_{0.5}Ca_{0.5}Al_2O_4$: Eu, Dy (Eu: 0.5 mol % Dy: 0.5 mol %) | 1.0 | 1.00 | 0.99 | 1.00 |
| $Sr_{0.5}Ba_{0.5}Al_2O_4$: Eu, Dy (Eu: 0.5 mol % Dy: 0.5 mol %) | 1.0 | 1.01 | 1.01 | 1.01 |
| $Sr_{0.5}Mg_{0.5}Al_2O_4$: Eu, Dy (Eu: 0.5 mol % Dy: 0.5 mol %) | 1.0 | 1.00 | 1.00 | 0.99 |

The foregoing phosphorescent phosphor is made of the novel phosphorescent phosphor material, which is completely different from the materials of the conventional sulfide phosphors. The foregoing phosphorescent phosphor exhibits afterglow characteristics lasting for a considerably longer time and higher luminance as compared with those of the conventional phosphors, and furthermore chemically stable because the phosphorescent phosphor is made of an oxide substance and exhibits excellent photo-resistance.

The phosphorescent phosphor according to the applied invention and expressed as $MAl_2O_4$ is not limited to the composition in which M, Al and O are accurately contained as 1:2:4. The ratio can accidently be out of the foregoing value by a somewhat degree due to any of a variety of conditions. As a matter of course, the somewhat deviation of the ratio is within the range of the foregoing applied invention so far as the foregoing effects can be obtained.

Accordingly, the applicant of the present invention measured the luminance of phosphorescent phosphors respectively arranged to have intentionally deviated ratios.

As a result, a fact was found that excellent afterglow luminance could be sometimes realized even if the foregoing ratio was not satisfied.

SUMMARY OF THE INVENTION

In view of the foregoing, an object of the present invention is to provide a phosphorescent phosphor of a type having a composition in which M, Al and O are contained at an optimum ratio among phosphorescent phosphors exhibiting afterglow characteristics lasting for a considerably longer time and significantly higher luminance as compared with the currently available phosphor, and is chemically stable because the phosphorescent phosphor is made of an oxide substance and having excellent photo-resistance.

In order to achieve the foregoing object, according to claim 1 of the present invention, there is provided a phosphorescent phosphor comprising a matrix and having a composition expressed by $M_{1-x}Al_2O_{4-x}$ (except X=0) in which M is at least one metal element selected from a group consisting of calcium, strontium and barium, wherein europium is doped to said matrix as an activator and at least one element selected from a group consisting of lanthanum, cerium, praseodymium, neodymium, samarium, gadolinium, terbium, dysprosium, holmium, erbium, thulium, ytterbium and lutetium is doped to said matrix as a co-activator.

According to claim 2 of the present invention, a phosphorescent phosphor according to claim 1 is that X is in a range $-0.33 \leq x \leq 0.60$ (except x=0).

According to claim 3 of the present invention, a phosphorescent phosphor according to claim 1 is that 0.002% to 20% of europium is doped to said matrix as an activator in terms of mol % relative to the metal element expressed by M.

According to claim 4 of the present invention, a phosphorescent phosphor according to claims 1 is that 0.002% to 20% of at least one element selected from a group consisting of lanthanum, cerium, praseodymium, neodymium, samarium, gadolinium, terbium, dysprosium, holmium, erbium, thulium, ytterbium, lutetium is doped to said matrix as a co-activator in terms of mol % relative to the metal element expressed by M.

According to claim 5 of the present invention, there is provided a phosphorescent phosphor according to claim 1 that magnesium is doped to M.

According to claim 6 of the present invention, there is provided a phosphorescent phosphor according to claim 2 that 0.002% to 20% of europium is doped to the matrix as an activator in terms of mol % relative to the metal element expressed by M.

According to claim 7 of the present invention, there is provided a phosphorescent phosphor according to claim 2 that 0.002% to 20% of at least one element selected from a group consisting of lanthanum, cerium, praseodymium, neodymium, samarium, gadolinium, terbium, dysprosium, holmium, erbium, thulium, ytterbium, lutetium is doped to the matrix as a co-activator in terms of mol % relative to the metal element expressed by M.

According to claim 8 of the present invention, there is provided a phosphorescent phosphor according to claim 6 that 0.002% to 20% of at least one element selected from a group consisting of lanthanum, cerium, praseodymium, neodymium, samarium, gadolinium, terbium, dysprosium, holmium, erbium, thulium, ytterbium, lutetium is doped to the matrix as a co-activator in terms of mol % relative to the metal element expressed by M.

According to claim 9 of the present invention, there is provided a phosphorescent phosphor according to claim 2 that magnesium is doped to M.

According to claim 10 of the present invention, there is provided a phosphorescent phosphor according to claim 6 that magnesium is doped to M.

According to claim 11 of the present invention, there is provided a phosphorescent phosphor according to claim 8 that magnesium is doped to M.

According to claim 12 of the present invention, there is provided a phosphorescent phosphor according to claim 3 that 0.002% to 20% of at least one element selected from a group consisting of lanthanum, cerium, praseodymium, neodymium, samarium, gadolinium, terbium, dysprosium, holmium, erbium, thulium, ytterbium, lutetium, manganese, tin and bismuth is doped to the matrix as a co-activator in terms of mol % relative to the metal element expressed by M.

According to claim 13 of the present invention, there is provided a phosphorescent phosphor according to claim 3 that magnesium is doped to M.

According to claim 14 of the present invention, there is provided a phosphorescent phosphor according to claim 4 that magnesium is doped to M.

According to claim 15 of the present invention, there is provided a phosphorescent phosphor according to claim 7 that magnesium is doped to M.

BRIEF DESCRIPTION OF THE DRAWINGS

FIG. 1 is a graph showing the results of analysis of a crystal structure of $SrAl_2O_4$: Eu phosphorescent phosphor by XRD;

FIG. 3 is a graph showing the results of the comparison between the afterglow characteristics of $SrAl_2O_4$: Eu phosphorescent phosphor and the afterglow characteristics of ZnS: Cu phosphor;

FIG. 8 is a graph showing the results of analysis of the crystal structure of $CaAl_2O_4$: Eu phosphorescent phosphor by XRD;

FIG. 9A and 9B are graphs showing the thermoluminescence characteristics of $CaAl_2O_4$: Eu, phosphorescent phosphor which employs neodymium or samarium as the co-activator;

FIG. 10A and 10B are graphs showing the thermoluminescence characteristics of $CaAl_2O_4$: Eu phosphorescent phosphor which employs dysprosium or thurium as the co-activator;

FIG. 12 is a graph showing the results of the comparison between the afterglow characteristics of $CaAl_2O_4$: Eu, Sm phosphorescent phosphor and $CaAl_2O_4$: Eu, Nd phosphorescent phosphor and the afterglow characteristics of ZnS: Cu phosphor;

FIG. 14A and 14B are graphs showing the excitation spectrum of $BaAl_2O_4$: Eu, Sm phosphorescent phosphor and the emission spectrum thereof obtained 30 minutes after cessation of excitation;

FIG. 15 is a graph showing the emission spectrum of $Sr0.5Ca0.5Al_2O_4$: Eu, Dy phosphorescent phosphor;

FIG. 16 is a graph showing the results of the comparison between the afterglow characteristics of $SrxCa_{1-x}Al_2O_4$: Eu, Dy phosphorescent phosphor and the afterglow characteristics of ZnS: Cu phosphor and CaSrS: Bi phosphorescent phosphor;

FIG. 17 is a graph showing the results of the comparison between the afterglow characteristics of $SrxBa_{1-x}Al_2O_4$: Eu, Dy phosphorescent phosphor and the afterglow characteristics of ZnS: Cu phosphor; and FIG. 18 is a graph showing the results of the comparison between the afterglow characteristics of $SrxMg_{1-x}Al_2O_4$: Eu, Dy phosphorescent phosphor and the afterglow characteristics of ZnS: Cu phosphor.

DETAILED DESCRIPTION OF THE PREFERRED EMBODIMENTS

Figure 2B:
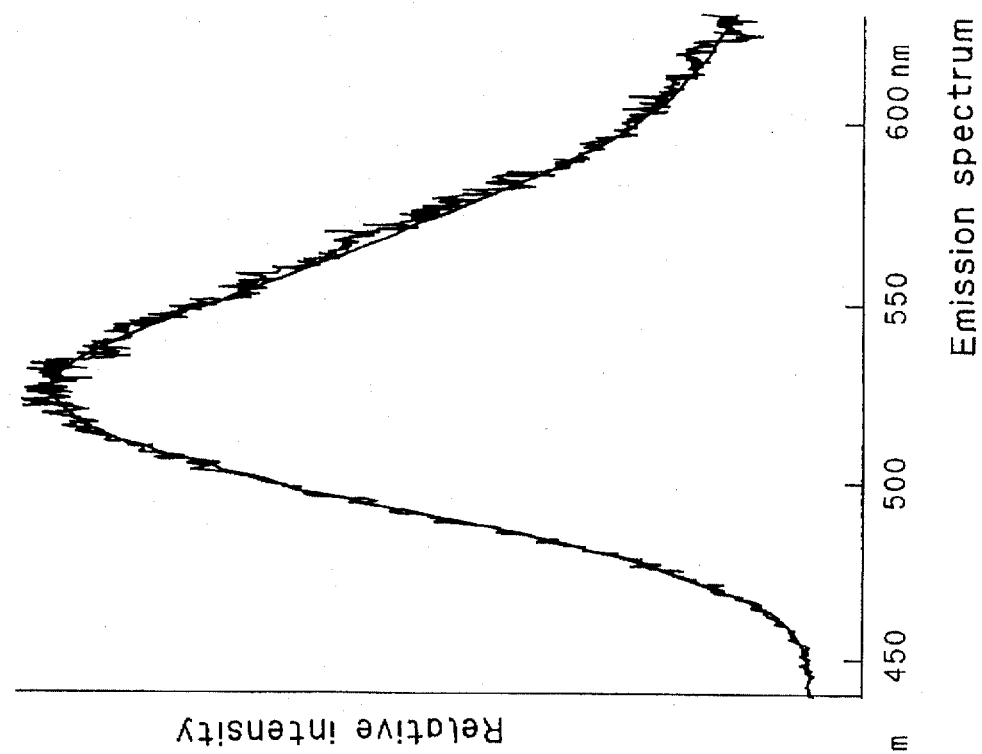
FIGS. 2A and 2B are graphs showing the excitation spectrum of $SrAl_2O_4$: Eu phosphorescent phosphor and the emission spectrum thereof obtained 30 minutes after cessation of excitation.
Figure 2A:
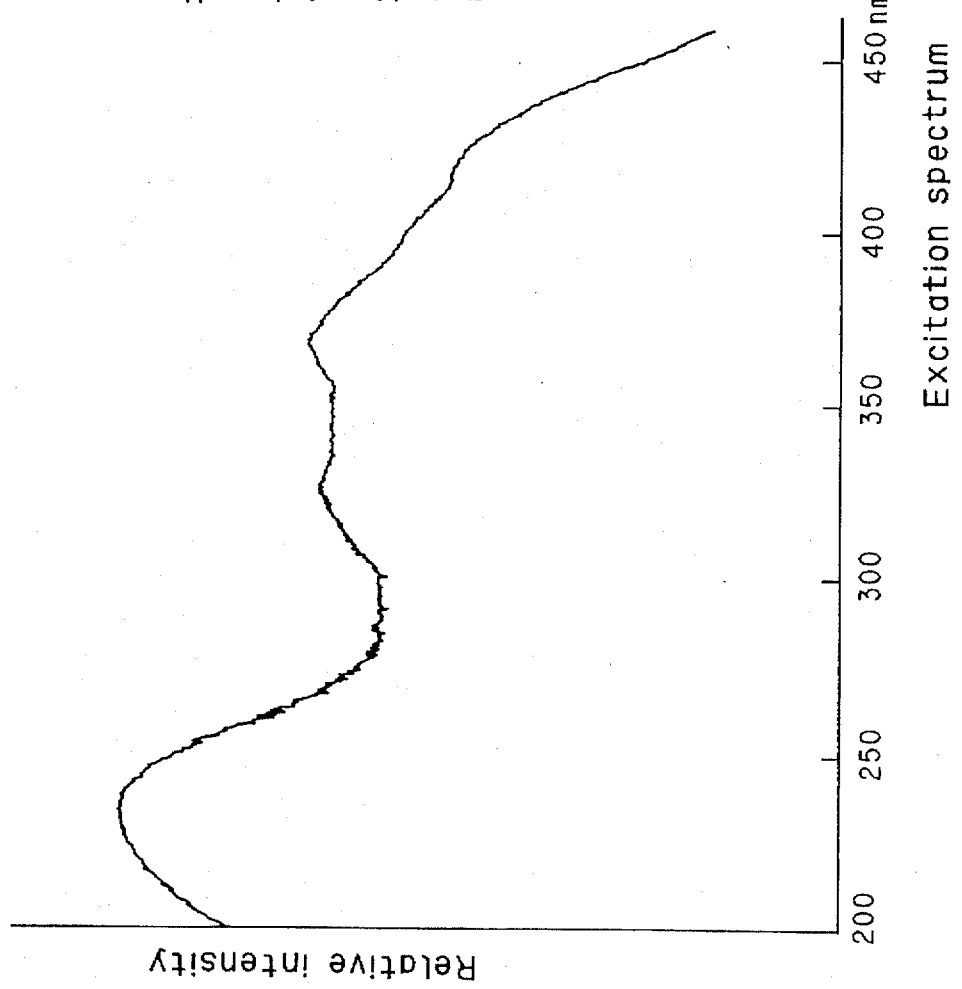
Figure 4:
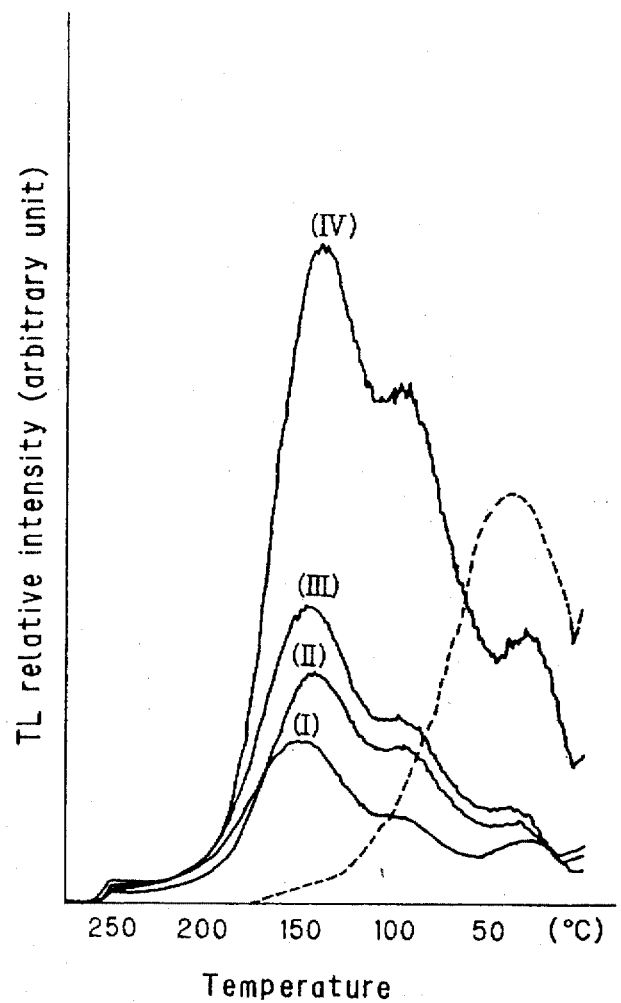
FIG. 4 is a-graph showing the thermo-luminescence characteristics of $SrAl_2O_4$: Eu phosphorescent phosphor.
Figure 5:
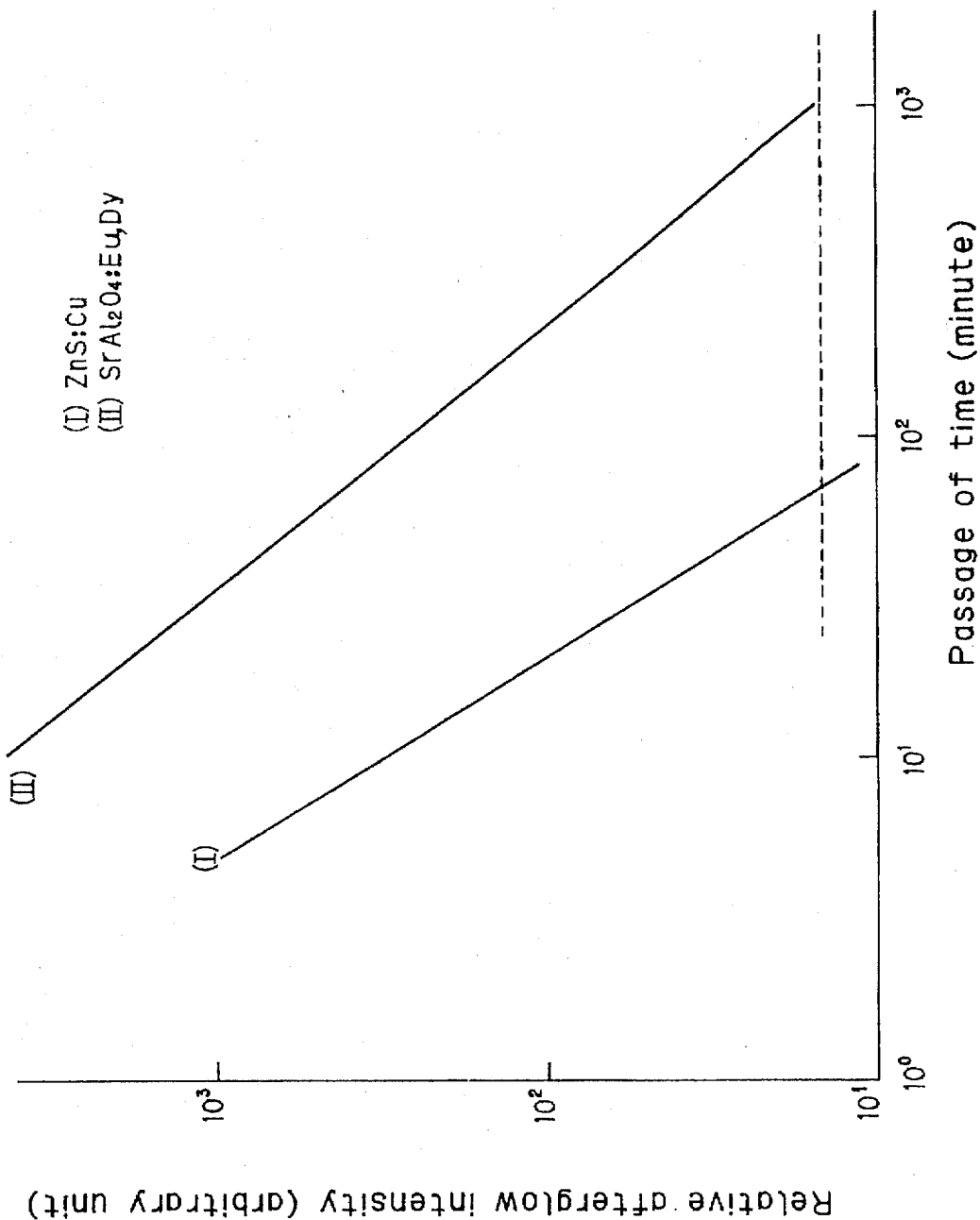
FIG. 5 is a graph showing the results of the comparison between the afterglow characteristics of $SrAl_2O_4$: Eu, Dy phosphorescent phosphor and the afterglow characteristics of ZnS: Cu phosphor.
Figure 6:
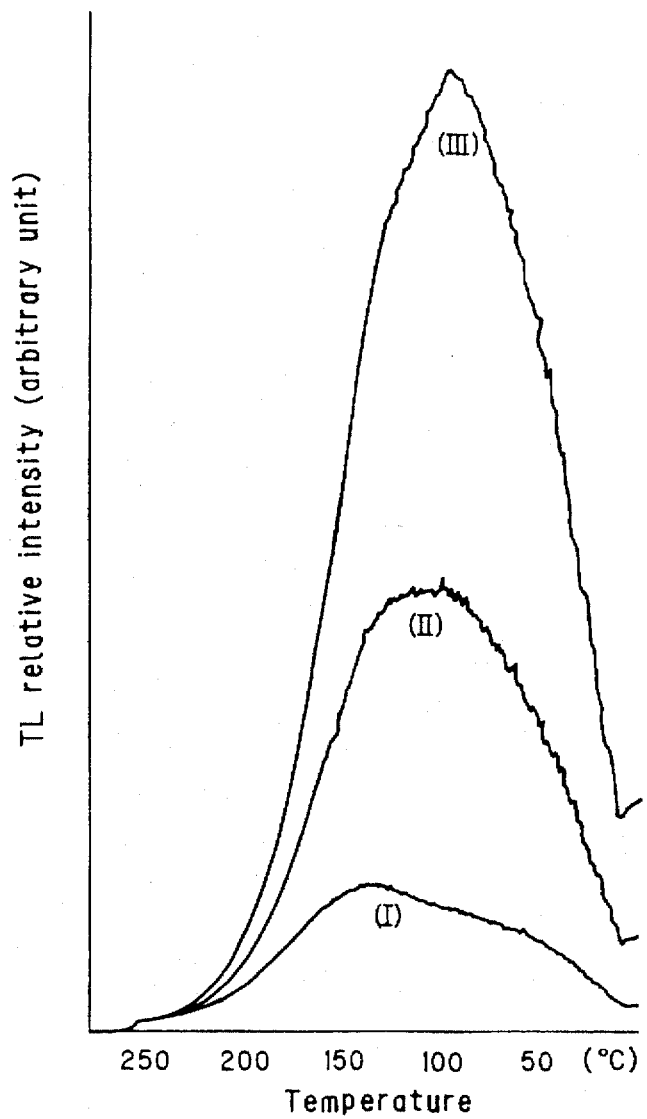
FIG. 6 is a graph showing the thermo-luminescence characteristics of $SrAl_2O_4$: Eu, Dy phosphorescent phosphor.
Figure 7:
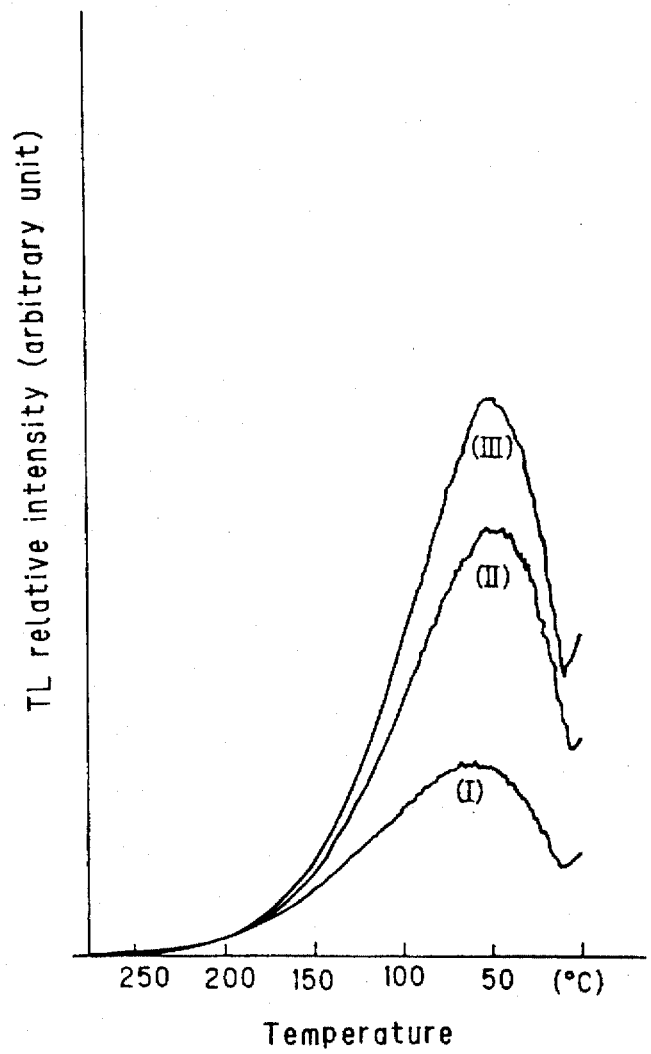
FIG. 7 is a graph showing the thermo-luminescence characteristics of $SrAl_2O_4$: Eu, Nd phosphorescent phosphor.
Figure 11:
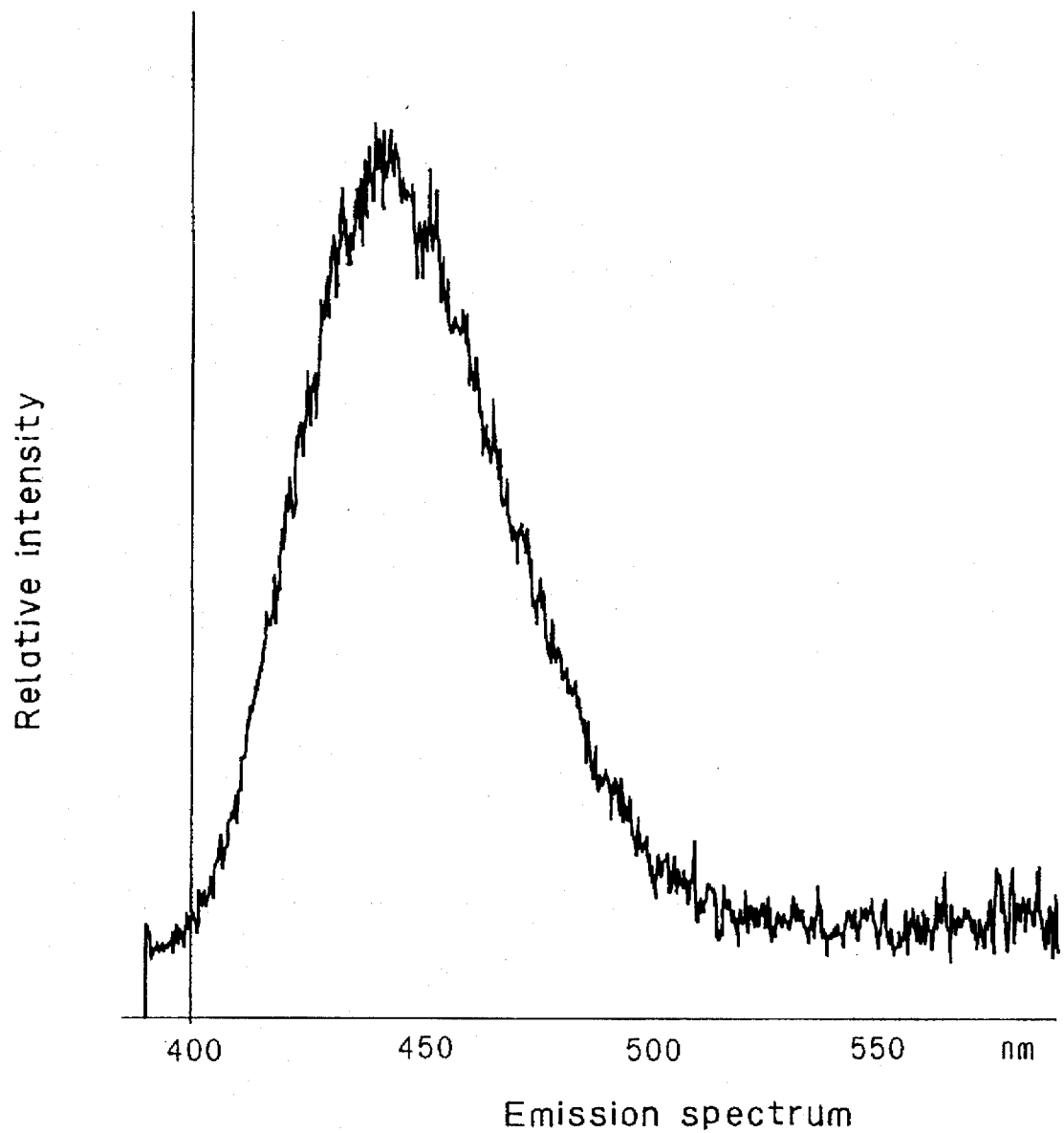
FIG. 11 is a graph showing the emission spectrum of $CaAl_2O_4$: Eu phosphorescent phosphor obtained 5 minutes after cessation,of excitation.
Figure 13B:
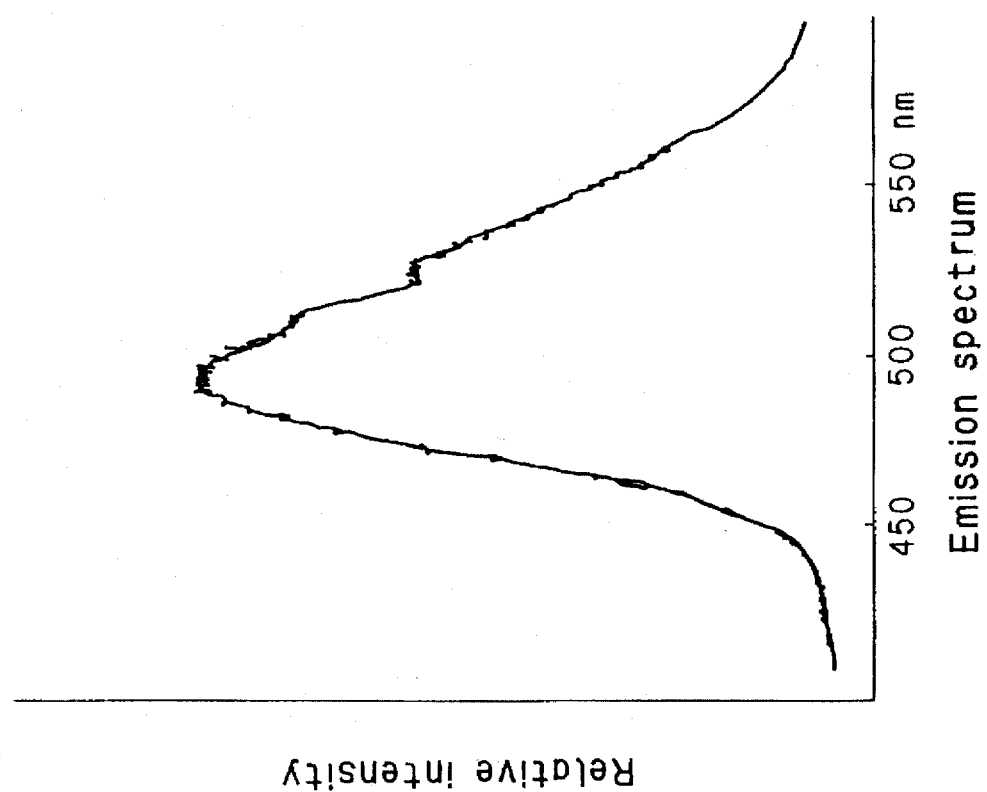
FIGS. 13A and 13B are graphs showing the excitation spectrum of $BaAl_2O_4$: Eu, Nd phosphorescent phosphor and the emission spectrum thereof obtained 30 minutes after cessation of excitation.
Figure 13A:
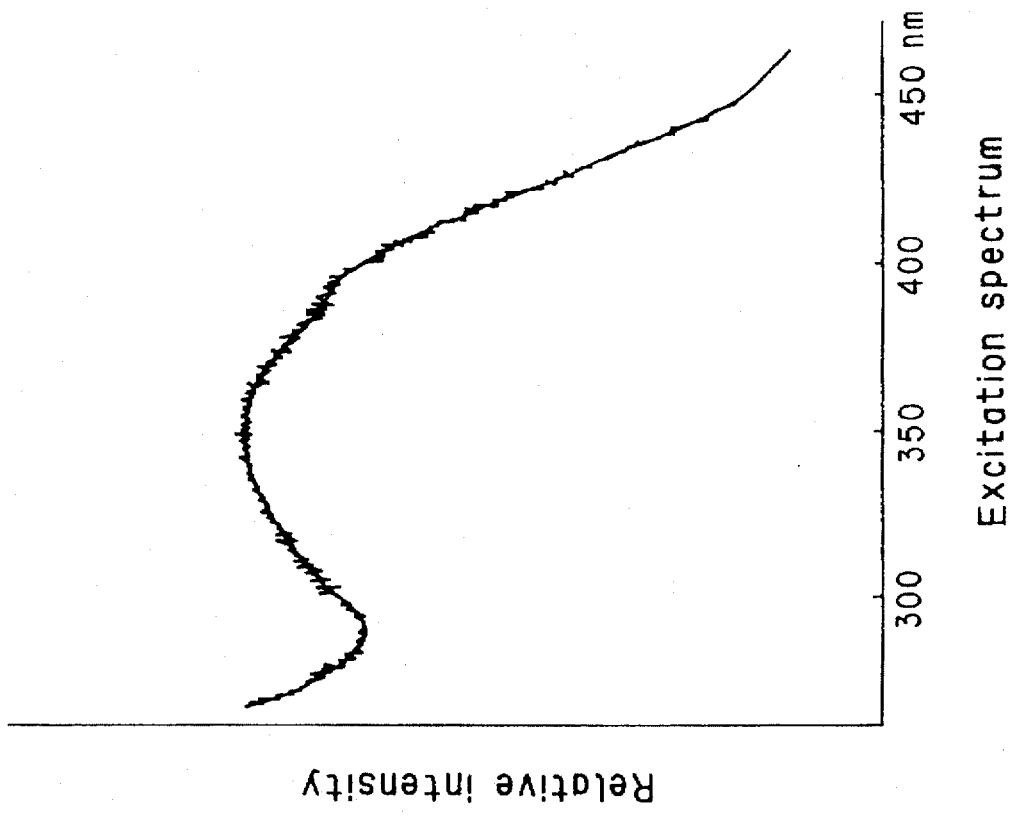

A phosphorescent phosphor having a composition expressed by $M_{1-x}Al_2O_{4-x}$ will now be described as $Sr_{1-x}Al_2O_{4-x}$: Eu, Dy in which strontium is used as the metal element (M), europium is used as the activator, and dysprosium is used as the co-activator.

The concentration of doped Eu and Dy was 0.01 mol with respect to the quantity of strontium.

The ratios of strontium and aluminum, the values of X and the phosphorescent phosphor samples (1) to (8) were as follows:

| | |
|---|---|
| Sr:Al=1:1.5 X=−0.33 $Sr_{1.33}Al_2O_{5.33}$:Eu, Dy | (1) |
| Sr:Al=1:1.9 X=−0.05 $Sr_{1.05}Al_2O_{4.05}$:Eu, Dy | (2) |
| Sr:Al=1:2.0 X=0 $Sr_{1.00}Al_2O_{4.00}$:Eu, Dy | (3) |
| Sr:Al=1:2.1 X=0.05 $Sr_{0.95}Al_2O_{3.95}$:Eu, Dy | (4) |
| Sr:Al=1:2.5 X=0.20 $Sr_{0.80}Al_2O_{3.80}$:Eu, Dy | (5) |
| Sr:Al=1:3.0 X=0.33 $Sr_{0.67}Al_2O_{3.67}$:Eu, Dy | (6) |
| Sr:Al=1:4.0 X=0.50 $Sr_{0.50}Al_2O_{3.50}$:Eu, Dy | (7) |
| Sr:Al=1:5.0 X=0.60 $Sr_{0.40}Al_2O_{3.40}$:Eu, Dy | (8) |

The samples (1) to (8) were temporarily brought to a non afterglow state, and then the samples were allowed to stand at room temperature for 20 minutes. Then, the luminance attained three minutes after was visually measured. In the foregoing state, the afterglow luminance was subjected to a comparison with that attained in a case where X=0 was made to be 100. Table 26 shows the results.

TABLE 26

| Sample | Luminance |
|---|---|
| (1) $Sr_{1.33}Al_2O_{5.33}$: Eu, Dy | 10 |
| (2) $Sr_{1.05}Al_2O_{4.05}$: Eu, Dy | 45 |
| (3) $Sr_{1.00}Al_2O_{4.00}$: Eu, Dy | 100 |
| (4) $Sr_{0.95}Al_2O_{3.95}$: Eu, Dy | 100 |
| (5) $Sr_{0.80}Al_2O_{3.80}$: Eu, Dy | 110 |
| (6) $Sr_{0.67}Al_2O_{3.67}$: Eu, Dy | 90 |
| (7) $Sr_{0.50}Al_2O_{3.50}$: Eu, Dy | 60 |
| (8) $Sr_{0.40}Al_2O_{3.40}$: Eu, Dy | 30 |

As can be understood from Table 26, the afterglow luminance of samples (1) and (2) was inferior to that of sample (3), which was $SrAl_2O_4$: Eu, Dy and in which X=0. However, samples (4) to (6) had afterglow luminance equivalent or superior to that of sample (3).

Samples (1) to (5) enabled phosphorescent phosphors each having the fluorescent spectrum peak at about 520 nm and emitting green fluorescent light to be obtained.

Samples (6) to (8) enabled phosphorescent phosphors each having the fluorescent spectrum peak at about 490 nm and emitting blue green fluorescent light to be obtained.

Thus, if the phosphorescent phosphor containing strontium as the metal element (M), europium serving as the activator and dysprosium serving as the co-activator satisfies $-0.33 \leq X \leq 0.60$ when the phosphorescent phosphor is expressed as $Sr_{1-x}Al_2O_{4-x}$: Eu, Dy, practically high afterglow luminance could be obtained, more preferably $0 \leq X \leq 0.33$.

To obtain blue green fluorescent light, a suitable range being $0.33 \leq X \leq 0.60$ was understood from the foregoing experiment data. Furthermore, even if the foregoing range was met, afterglow luminance raising no practical problem was observed.

Then, a phosphorescent phosphor having a composition expressed by $M_{1-x}Al_2O_{4-x}$ of a type containing calcium as the metal element (M), europium serving as the activator and dysprosium serving as the co-activator and in the form of $Ca_{1-x}Al_2O_{4-x}$: Eu, Dy will now be described.

The concentration of doped Eu and Dy was 0.01 mol with respect to the quantity of calcium.

The ratios of calcium and aluminum, the values of X and the phosphorescent phosphor samples (1) to (8) were as follows:

Ca:Al=1:1.5 X=−0.33 $Ca_{1.33}Al_2O_{5.33}$:Eu, Dy (1)

Ca:Al=1:1.9 X=−0.05 $Ca_{1.05}Al_2O_{4.05}$:Eu, Dy (2)

Ca:Al=1:2.0 X=0 $Ca_{1.00}Al_2O_{4.00}$:Eu, Dy (3)

Ca:Al=1:2.1 X=0.05 $Ca_{0.95}Al_2O_{3.95}$:Eu, Dy (4)

Ca:Al=1:2.5 X=0.20 $Ca_{0.80}Al_2O_{3.80}$:Eu, Dy (5)

Ca:Al=1:3.0 X=0.33 $Ca_{0.67}Al_2O_{3.67}$:Eu, Dy (6)

Ca:Al=1:4.0 X=0.50 $Ca_{0.50}Al_2O_{3.50}$:Eu, Dy (7)

Ca:Al=1:5.0 X=0.60 $Ca_{0.40}Al_2O_{3.40}$:Eu, Dy (8)

The samples (1) to (8) were temporarily brought to a non afterglow state, and then the samples were allowed to stand at room temperature for 20 minutes. Then, the luminance attained three minutes after was visually measured. In the foregoing state, the afterglow luminance was subjected to a comparison with that attained in a case where X=0 was made to be 100. Table 27 shows the results.

TABLE 27

| Sample | Luminance |
|---|---|
| (1) $Ca_{1.33}Al_2O_{5.33}$: Eu, Dy | 70 |
| (2) $Ca_{1.05}Al_2O_{4.05}$: Eu, Dy | 90 |
| (3) $Ca_{1.00}Al_2O_{4.00}$: Eu, Dy | 100 |
| (4) $Ca_{0.95}Al_2O_{3.95}$: Eu, Dy | 80 |
| (5) $Ca_{0.80}Al_2O_{3.80}$: Eu, Dy | 40 |
| (6) $Ca_{0.67}Al_2O_{3.67}$: Eu, Dy | 20 |
| (7) $Ca_{0.50}Al_2O_{3.50}$: Eu, Dy | 15 |
| (8) $Ca_{0.40}Al_2O_{3.40}$: Eu, Dy | 10 |

As can be understood from Table 27, the afterglow luminance of samples (1), (2) and (4) to (6) was inferior to that of sample (3), which was $CaAl_2O_4$: Eu, Dy and in which X=0, but the foregoing samples were satisfactorily used.

Thus, if the phosphorescent phosphor containing calcium as the metal element (M), europium serving as the activator and dysprosium serving as the co-activator satisfies $-0.33 \leq X \leq 0.60$ when the phosphorescent phosphor is expressed as $Ca_{1-x}Al_2O_{4-x}$: Eu, Dy, practically high afterglow luminance could be obtained, more preferably $-0.33 \leq X \leq 0.05$.

Then, a phosphorescent phosphor having a composition expressed by $M_{1-x}Al_2O_{4-x}$ of a type containing barium as the metal element (M), europium serving as the activator and dysprosium serving as the co-activator and in the form of $Sr_{1-x}Al_2O_{4-x}$: Eu, Dy will now be described.

The concentration of doped Eu and Dy was 0.01 mol with respect to the quantity of calcium.

The ratios of barium and aluminum, the values of X and the phosphorescent phosphor samples (1) to (7) were as follows:

Ba:Al=1:1.5 X=−0.33 $Ba_{1.33}Al_2O_{5.33}$:Eu, Dy (1)

Ba:Al=1:1.9 X=−0.05 $Ba_{1.05}Al_2O_{4.05}$:Eu, Dy (2)

Ba:Al=1:2.1 X=0.05 $Ba_{0.95}Al_2O_{3.95}$:Eu, Dy (3)

Ba:Al=1:2.5 X=0.20 $Ba_{0.80}Al_2O_{3.80}$:Eu, Dy (4)

Ba:Al=1:3.0 X=0.33 $Ba_{0.67}Al_2O_{3.67}$:Eu, Dy (5)

Ba:Al=1:4.0 X=0.50 $Ba_{0.50}Al_2O_{3.50}$:Eu,Dy (6)

Ba:Al=1:5.0 X=0.60 $Ba_{0.40}Al_2O_{3.40}$:Eu, Dy (7)

The samples (1) to (7) were temporarily brought to a non afterglow state, and then the samples were allowed to stand at room temperature for 20 minutes. Then, the luminance attained three minutes after was visually measured. In the foregoing state, the afterglow luminance was subjected to a comparison with that attained in a case where X=0 was made to be 100. Table 28 shows the results.

TABLE 28

| Sample | Luminance |
|---|---|
| (1) $Ba_{1.33}Al_2O_{5.33}$: Eu, Dy | 10 |
| (2) $Ba_{1.05}Al_2O_{4.05}$: Eu, Dy | 20 |
| (3) $Ba_{0.95}Al_2O_{3.95}$: Eu, Dy | 100 |
| (4) $Ba_{0.80}Al_2O_{3.80}$: Eu, Dy | 110 |
| (5) $Ba_{0.67}Al_2O_{3.67}$: Eu, Dy | 105 |

TABLE 28-continued

| Sample | Luminance |
| --- | --- |
| (6) $Ba_{0.50}Al_2O_{3.50}$: Eu, Dy | 70 |
| (7) $Ba_{0.40}Al_2O_{3.40}$: Eu, Dy | 50 |

As can be understood from Table 28, the afterglow luminance of samples (1) and (2) was inferior to that of sample (3), which was $Ba_{0.95}Al_2O_{3.95}$: Eu,Dy and in which X=2.1, but samples (4) and (5) had afterglow characteristics somewhat higher than that of sample (3). Furthermore, samples (6) and (7) could be used practically.

Thus, if the phosphorescent phosphor containing barium as the metal element (M), ouropium serving as the activator and dysprosium serving as the co-activator satisfies $-0.33 \leq X \leq 0.60$ when the phosphorescent phosphor is expressed as $Ba_{1-x}Al_2O_{4-x}$: Eu, Dy, practically high afterglow luminance could be obtained, more preferably $0.05 \leq X \leq 0.50$.

Even if the ratio of ouropium serving as the activator and the dysprosium serving as the co-activator was changed in each of the examples, a similar tendency was confirmed by the applicant of the present invention.

Furthermore, in the case where magnesium was doped to strontium, calcium and barium as the metal element (M), if the compound having the composition expressed by $M_{1-x}Al_2O_{4-x}$ met $-0.33 \leq X \leq 0.60$, afterglow luminance which was satisfactory in the viewpoint of practical use was attained.

In a case where 0.002% to 20% of at least one element selected from a group consisting of lanthanum, cerium, praseodymium, neodymium, samarium, gadolinium, terbium, holmium, erbium, thulium, ytterbium, lutetium, manganese, tin and bismuth is doped as a co-activator in terms of mol % relative to the metal element expressed by M in addition to dysprosium serving as the co-activator, if X of a compound having a composition expressed by $M_{1-x}Al_2O_{4-x}$ satisfied $-0.33 \leq X \leq 0.60$, afterglow luminance which was satisfactory in the viewpoint of practical use was attained.

In the case where calcium and barium were employed as the metal element (M), even if the ratio of europium serving as the activator and the dysprosium serving as the co-activator was changed in each of the examples, a similar tendency was confirmed by the applicant of the present invention.

Furthermore, in the case where magnesium was doped to strontium, calcium and barium as the metal element (M), if the compound having the composition expressed by $M_{1-x}Al_2O_{4-x}$ met $-0.33 \leq X \leq 0.60$, afterglow luminance which was satisfactory in the viewpoint of practical use was attained.

In a case where at least one element selected from a group consisting of lanthanum, cerium, praseodymium, neodymium, samarium, gadolinium, terbium, holmium, erbium, thulium, ytterbium, lutetium, manganese, tin and bismuth is doped as a co-activator in terms of mol % relative to the metal element expressed by M in addition to dysprosium, if X of a compound having a composition expressed by $M_{1-x}Al_2O_{4-x}$ satisfied $-0.33 \leq X \leq \leq 0.60$, afterglow luminance which was satisfactory in the viewpoint of practical use was attained.

For use, the foregoing phosphorescent phosphor may be coated on the surface of any of various products or may be formed into a sheet-like shape so as to be applied for use. It may also be mixed into a plastic material, rubber or glass.

Also, phosphorescent phosphor according to the present invention may replace conventional sulfide phosphors. The phosphorescent phosphor according to the present invention will show excellent characteristics in applying it to various gauges, dial plates of clocks, and safety signs, due to the long-lasting high-luminance afterglow characteristics thereof.

The phosphorescent phosphor according to the present invention can be employed in any of the following applications, because it has excellent long-lasting high luminance afterglow characteristics and because it is an oxide and hence chemically stable and shows excellent photo-resistance.

Indicator for vehicles: airplane, ship, automobile, bicycle, key, key hole

Indicator for signs: traffic sign, indicator of traffic lanes, indicator for a guard rail, fishing buoy, direction board on a maintain trail, direction board which guides a guest from a gate to a front door, indication on helmet Outdoor indicator: signboard, indicator for buildings, indicator for the key hole of automobile, Indoor indicator: electrical appliance switches Stationery: writing instruments, luminous ink, map, star chart Toys: Jigsaw puzzle Special usage: sports ball, fishing tackles, threads, cloths, back-light for liquid crystal (for use in, for example, clock), replacement of isotope used for discharge tube As described above, the present invention relates to a novel phosphorescent phosphor which is completely different from well-known sulfide phosphors, and has much longer high-luminance afterglow characteristics as compared with sulfide phosphors which are available on the market. Further, the phosphorescent phosphor according to the present invention is chemically stable because it is an oxide and has excellent photo-resistance. Among phosphorescent phosphors exhibiting excellent photo-resistance, a phosphorescent phosphor containing M, Al and O at an optimum ratio can be provided.

What is claimed is:

1. A phosphorescent phosphor comprising a matrix expressed by $M_{1-x}Al_2O_{4-x}$ (except X=0) in which M is at least one metal element selected from a group consisting of calcium, strontium and barium, wherein europium is doped to said matrix as an activator and at least one element selected from a group consisting of cerium, praseodymium, neodymium, samarium, terbium, dysprosium, holmium, erbium, thulium, ytterbium and lutetium is doped to said matrix as a co-activator.

2. A phosphorescent phosphor according to claim 1, wherein X is in a range $-0.33 \leq x \leq 0.60$ (except x=0).

3. A phosphorescent phosphor according to claim 1, wherein 0.002% to 20% of europium is doped to said matrix as an activator in terms of mol % relative to the metal element expressed by M.

4. A phosphorescent phosphor according to claim 1, wherein 0.002% to 20% of at least one element selected from a group consisting of cerium, praseodymium, neodymium, samarium, terbium, dysprosium, holmium, erbium, thulium, ytterbium, lutetium, is doped to said matrix as a co-activator in terms of mol % relative to the metal element expressed by M.

5. A phosphorescent phosphor according to claim 1, wherein magnesium is doped to M.

6. A phosphorescent phosphor according to claim 2, wherein 0.002% to 20% of europium is doped to said matrix as an activator in terms of mol % relative to the metal element expressed by M.

7. A phosphorescent phosphor according to claim 2, wherein 0.002% to 20% of at least one element selected from a group consisting of cerium, praseodymium, neodymium, samarium, terbium, dysprosium, holmium, erbium, thulium, ytterbium, lutetium, is doped to said matrix as a co-activator in terms of mol % relative to the metal element expressed by M.

8. A phosphorescent phosphor according to claim 6, wherein 0.002% to 20% of at least one element selected from a group consisting of cerium, praseodymium, neodymium, samarium, terbium, dysprosium, holmium, erbium, thulium, ytterbium, lutetium, is doped to said matrix as a co-activator in terms of mol % relative to the metal element expressed by M.

9. A phosphorescent phosphor according to claim 2, wherein magnesium is doped to M.

10. A phosphorescent phosphor according to claim 6, wherein magnesium is doped to M.

11. A phosphorescent phosphor according to claim 8, wherein magnesium is doped to M.

12. A phosphorescent phosphor according to claim 3, wherein 0.002% to 20% of at least one element selected from a group consisting of cerium, praseodymium, neodymium, samarium, terbium, dysprosium, holmium, erbium, thulium, ytterbium, lutetium, doped to said matrix as a co-activator in terms of mol % relative to the metal element expressed by M.

13. A phosphorescent phosphor according to claim 3, wherein magnesium is doped to M.

14. A phosphorescent phosphor according to claim 4, wherein magnesium is doped to M.

15. A phosphorescent phosphor according to claim 7, wherein magnesium is doped to M.

* * * * *